US011906741B2

(12) United States Patent
Motohashi et al.

(10) Patent No.: US 11,906,741 B2
(45) Date of Patent: Feb. 20, 2024

(54) DISPLAY CONTROL DEVICE, DISPLAY CONTROL METHOD, AND NON-TRANSITORY COMPUTER-READABLE MEDIUM STORING PROGRAM

(71) Applicants: NEC Corporation, Tokyo (JP); NEC Solution Innovators, Ltd., Tokyo (JP)

(72) Inventors: Yousuke Motohashi, Tokyo (JP); Mayo Taketa, Tokyo (JP); Takashi Nonaka, Tokyo (JP); Hiroaki Yanagisawa, Tokyo (JP)

(73) Assignees: NEC CORPORATION, Tokyo (JP); NEC Solution Innovators, Ltd., Tokyo (JP)

( * ) Notice: Subject to any disclaimer, the term of this patent is extended or adjusted under 35 U.S.C. 154(b) by 0 days.

(21) Appl. No.: 17/289,286

(22) PCT Filed: Oct. 30, 2019

(86) PCT No.: PCT/JP2019/042535
§ 371 (c)(1),
(2) Date: Apr. 28, 2021

(87) PCT Pub. No.: WO2020/095784
PCT Pub. Date: May 14, 2020

(65) Prior Publication Data
US 2021/0389588 A1 Dec. 16, 2021

(30) Foreign Application Priority Data

Nov. 6, 2018 (JP) ................................ 2018-208811

(51) Int. Cl.
*G02B 27/01* (2006.01)
*G06T 19/00* (2011.01)
(Continued)

(52) U.S. Cl.
CPC ........ *G02B 27/0172* (2013.01); *G06T 19/006* (2013.01); *G09B 5/02* (2013.01); *G09B 5/10* (2013.01); *G02B 2027/014* (2013.01)

(58) Field of Classification Search
CPC . G02B 2027/014; G02B 27/0172; G06F 3/01; G06F 3/0484; G06T 19/006;
(Continued)

(56) References Cited

U.S. PATENT DOCUMENTS 9,498,704 B1 * 11/2016 Cohen ..................... A63F 13/67
9,721,566 B2 * 8/2017 Newendorp ............ G10L 15/22
(Continued)

FOREIGN PATENT DOCUMENTS

JP  2009-169714 A  7/2009
JP  2010-073219 A  4/2010
(Continued)

OTHER PUBLICATIONS

Japanese Office Action for JP Application No. 2020-555999 dated Jun. 14, 2022 with English Translation.
(Continued)

*Primary Examiner* — Dmitriy Bolotin

(57) ABSTRACT

A display control device includes a first display control unit performing control so as to display a page, which is being displayed in a real space, in a first material as a presentation material used in a presentation by a presenter in a first position in a virtual reality space, a second display control unit performing control so as to display a second material in a second position which is different from the first position in the virtual reality space, and an operation input information acquisition unit acquiring first operation input information as operation input information which is input by a viewer experiencing the virtual reality space and which is about display of the second material, in which the second display
(Continued)

control unit changes a display manner of the second material based on the first operation input information.

13 Claims, 16 Drawing Sheets

(51) Int. Cl.
  *G09B 5/02* (2006.01)
  *G09B 5/10* (2006.01)
(58) Field of Classification Search
  CPC ... G09B 5/02; G09B 5/10; G09G 5/00; G09G 5/36; G09G 5/38
  See application file for complete search history.

(56) References Cited

U.S. PATENT DOCUMENTS

| | | | |
|---|---|---|---|
| 9,990,044 B2* | 6/2018 | Needham | G06F 3/012 |
| 10,057,269 B1* | 8/2018 | Ellingson | H04L 63/101 |
| 2004/0193413 A1* | 9/2004 | Wilson | H04N 13/239 |
| | | | 382/209 |
| 2009/0189974 A1* | 7/2009 | Deering | G02B 27/0093 |
| | | | 348/51 |
| 2010/0218099 A1 | 8/2010 | Van Melle et al. | |
| 2012/0242560 A1* | 9/2012 | Nakada | G09G 3/3406 |
| | | | 345/8 |
| 2013/0024785 A1* | 1/2013 | Van Wie | H04M 3/567 |
| | | | 715/753 |
| 2014/0055342 A1* | 2/2014 | Kamimura | G06V 40/193 |
| | | | 345/156 |
| 2015/0049004 A1* | 2/2015 | Deering | G02B 27/0172 |
| | | | 345/8 |
| 2015/0347080 A1* | 12/2015 | Shin | G06F 3/012 |
| | | | 345/173 |
| 2016/0133170 A1* | 5/2016 | Fateh | G06F 3/04817 |
| | | | 345/428 |
| 2016/0140773 A1* | 5/2016 | Yajima | G02B 27/017 |
| | | | 345/633 |
| 2016/0173865 A1* | 6/2016 | Park | G06V 40/171 |
| | | | 348/118 |
| 2016/0188277 A1* | 6/2016 | Miyasaka | G06F 3/1454 |
| | | | 345/2.2 |
| 2016/0188283 A1* | 6/2016 | Sendai | G02B 27/0172 |
| | | | 345/8 |
| 2017/0010662 A1* | 1/2017 | Nishizawa | H04W 4/80 |
| 2017/0289533 A1 | 10/2017 | Ono | |
| 2017/0315614 A1* | 11/2017 | Sullivan | G06T 3/60 |
| 2017/0322623 A1* | 11/2017 | McKenzie | G06F 3/011 |
| 2018/0095635 A1* | 4/2018 | Valdivia | G02B 27/017 |
| 2018/0095636 A1* | 4/2018 | Valdivia | G06F 3/0482 |
| 2018/0096507 A1* | 4/2018 | Valdivia | G06F 3/04842 |
| 2018/0098059 A1* | 4/2018 | Valdivia | H04L 67/131 |
| 2018/0120935 A1* | 5/2018 | Kim | G02B 27/017 |
| 2018/0341811 A1* | 11/2018 | Bendale | G06V 10/25 |
| 2019/0095071 A1* | 3/2019 | Ichikawa | G09G 5/14 |
| 2019/0250699 A1* | 8/2019 | Mulase | G06F 3/011 |
| 2020/0133618 A1* | 4/2020 | Kim | G06F 3/147 |
| 2020/0209949 A1* | 7/2020 | Noris | G06Q 30/0241 |
| 2020/0210137 A1* | 7/2020 | Noris | G06F 3/0346 |
| 2020/0211251 A1* | 7/2020 | Noris | G06F 3/011 |
| 2020/0257121 A1* | 8/2020 | Yanagisawa | G06F 3/012 |
| 2021/0035535 A1* | 2/2021 | Kanda | G09G 5/373 |
| 2021/0093971 A1* | 4/2021 | Jang | G06F 3/0484 |
| 2021/0135895 A1* | 5/2021 | Cheung | G06V 40/172 |
| 2021/0383489 A1* | 12/2021 | Hutchinson | G06Q 50/14 |
| 2022/0075187 A1* | 3/2022 | Grahsl | H04N 13/279 |
| 2022/0254125 A1* | 8/2022 | Koch | G06F 3/011 |

FOREIGN PATENT DOCUMENTS

| | | |
|---|---|---|
| JP | 2011-018312 A | 1/2011 |
| JP | 2011-118531 A | 6/2011 |
| JP | 2011-198007 A | 10/2011 |
| JP | 2016-024751 A | 2/2016 |
| JP | 2017-102516 A | 6/2017 |
| JP | 2017-188126 A | 10/2017 |
| JP | 2018-067160 A | 4/2018 |

OTHER PUBLICATIONS

International Search Report for PCT Application No. PCT/JP2019/042535, dated Jan. 28, 2020.

* cited by examiner

| STATE ID | MATERIAL ID | USER ID | COORDINATES IN SPACE (LEFT UPPER COORDINATES) | COORDINATES IN SPACE (RIGHT LOWER COORDINATES) | MAGNIFI-CATION | PAGE NUMBER |
|---|---|---|---|---|---|---|
| S0001 | D0001 | U0001 | (10, 150, 200) | (210, 30, 200) | 1.0 | 5 |
| S0002 | D0002 | U0006 | (20, 220, 300) | (220, 40, 300) | 1.0 | 7 |
| .. | .. | .. | .. | .. | .. | .. |
| .. | .. | .. | .. | .. | .. | .. |
| .. | .. | .. | .. | .. | .. | .. |

Fig. 4

| STATE ID | MATERIAL ID | USER ID | COORDINATES IN SPACE (LEFT UPPER COORDINATES) | COORDINATES IN SPACE (RIGHT LOWER COORDINATES) | MAGNIFI-CATION | PAGE NUMBER | LEVEL |
|---|---|---|---|---|---|---|---|
| S0001 | D0001 | U0001 | (10, 150, 200) | (210, 30, 200) | 1.0 | 5 | 1 |
| S0002 | D0002 | U0006 | (20, 220, 300) | (220, 40, 300) | 1.0 | 7 | 1 |
| .. | .. | .. | .. | .. | .. | .. | .. |
| S0008 | D0001-a007 | U0001 | (-50, 150, 200) | (0, 120, 200) | 1.0 | 1 | 1 |
| .. | .. | .. | .. | .. | .. | .. | .. |

Fig. 10

| COMMENT ID | MATERIAL ID | USER ID | GROUP ID | PAGE NUMBER | RELATIVE COORDINATES IN MATERIAL (LEFT UPPER COORDINATES) | RELATIVE COORDINATES IN MATERIAL (RIGHT LOWER COORDINATES) | COMMENT CONTENT |
|---|---|---|---|---|---|---|---|
| C0001 | D0001 | U0001 | 2 | 1 | (0.6, 0.7, 0.3) | (0.6, 0.8, 0.6) | THIS GRAPH SHOWS INTERESTING RESULTS |
| C0002 | D0002 | U0006 | 1 | 1 | (0.3, 0.4, 0.1) | (0.3, 0.5, 0.4) | THE CONTENT GIVEN HERE IS AMAZING |
| ·· | ·· | ·· | ·· | ·· | ·· | ·· | ·· |
| ·· | ·· | ·· | ·· | ·· | ·· | ·· | ·· |
| ·· | ·· | ·· | ·· | ·· | ·· | ·· | ·· |

Fig. 14

DISPLAY CONTROL DEVICE, DISPLAY CONTROL METHOD, AND NON-TRANSITORY COMPUTER-READABLE MEDIUM STORING PROGRAM

This application is a National Stage Entry of PCT/JP2019/042535 filed on Oct. 30, 2019, which claims priority from Japanese Patent Application 2018-208811 filed on Nov. 6, 2018, the contents of all of which are incorporated herein by reference, in their entirety.

TECHNICAL FIELD

The present invention relates to a display control device, a display control method, and a program.

BACKGROUND ART

A presenter and viewers (audiences) are present in a presentation performed in a lecture, a conference, or the like. In general, a presenter gives an explanation about presentation materials displayed by a display device, and viewers listen to the explanation by the presenter while seeing the presentation materials displayed by this display device. In this case, in a case where an electronic file of the presentation materials is sent to a mobile terminal of the viewer, the viewer is capable of browsing a page other than the page presently displayed on a screen of the display device by using the mobile terminal. That is, although the page of the presentation materials displayed on the screen of the display device proceeds in accordance with progress of the presentation regardless of the intension of the viewer, separately from that, the viewer can browse a desired page by using the mobile terminal.

Incidentally, in recent years, studies and development about virtual reality (VR) have been actively made. For example, Patent Literature 1 discloses a technique of enlarging or shrinking an image displayed in a VR space based on a motion of the head of a user wearing a head mounted display (HMD).

CITATION LIST

Patent Literature

Patent Literature 1: Japanese Unexamined Patent Application Publication No. 2016-024751

SUMMARY OF INVENTION

Technical Problem

As described above, in a presentation, a material is displayed on a terminal at hand of an individual viewer separately from a display device for all viewers, and each of the viewers can thereby check a content other than a content presently displayed on a screen of the display device.

However, in this case, because the viewer has to move a sight line to the terminal at hand, the viewer cannot simultaneously see the content displayed on the display device which is arranged far in front of the viewer and is provided for all of the viewers. That is, in order to check both of the content displayed in accordance with progress of the presentation and the content to which the viewer desires to refer, the viewer has to repeat actions to largely change the sight line. This is due to a fact that the positional relationship of displayed positions of respective materials are fixed with respect to the position of the display device and the position of the viewer.

As for this fact, Patent Literature 1 only discloses change in size of an image to be displayed in a VR space but does not discuss browsing of plural materials in a presentation.

Accordingly, one of objects to be achieved by the example embodiments disclosed in the present specification is to provide a display control device, a display control method, and a program that can improve convenience of a viewer of a presentation in browsing materials.

Solution to Problem

A first aspect provides a display control device including:

first display control means for performing control so as to display a page, which is being displayed in a real space, in a first material as a presentation material used in a presentation by a presenter in a first position in a virtual reality space;

second display control means for performing control so as to display a second material in a second position which is different from the first position in the virtual reality space; and operation input information acquisition means for acquiring first operation input information as operation input information which is input by a viewer experiencing the virtual reality space and which is about display of the second material, in which the second display control means changes a display manner of the second material based on the first operation input information.

A second aspect provides a display control method including:

displaying a page, which is being displayed in a real space, in a first material as a presentation material used in a presentation by a presenter in a first position in a virtual reality space;

displaying a second material in a second position which is different from the first position in the virtual reality space; and changing a display manner of the second material based on first operation input information as operation input information which is input by a viewer experiencing the virtual reality space and which is about display of the second material.

A third aspect provides a program causing a computer to execute:

a first display control step of performing control so as to display a page, which is being displayed in a real space, in a first material as a presentation material used in a presentation by a presenter in a first position in a virtual reality space;

a second display control step of performing control so as to display a second material in a second position which is different from the first position in the virtual reality space; and an operation input information acquisition step of acquiring first operation input information as operation input information which is input by a viewer experiencing the virtual reality space and which is about display of the second material, in which in the second display control step, a display manner of the second material is changed based on the first operation input information.

Advantageous Effects of Invention

In the above aspects, a display control device, a display control method, and a program can be provided which can improve convenience of a viewer of a presentation in browsing materials.

BRIEF DESCRIPTION OF THE DRAWINGS

FIG. 4 is a diagram illustrating an example of display state data stored in a display state storage unit according to the first example embodiment.

FIG. 10 is a diagram illustrating an example of display state data stored in a display state storage unit according to the second example embodiment.

FIG. 14 is a diagram illustrating an example of comment data stored in a comment storage unit according to the third example embodiment.

DESCRIPTION OF EMBODIMENTS

Outline of Example Embodiment

Figure 1:
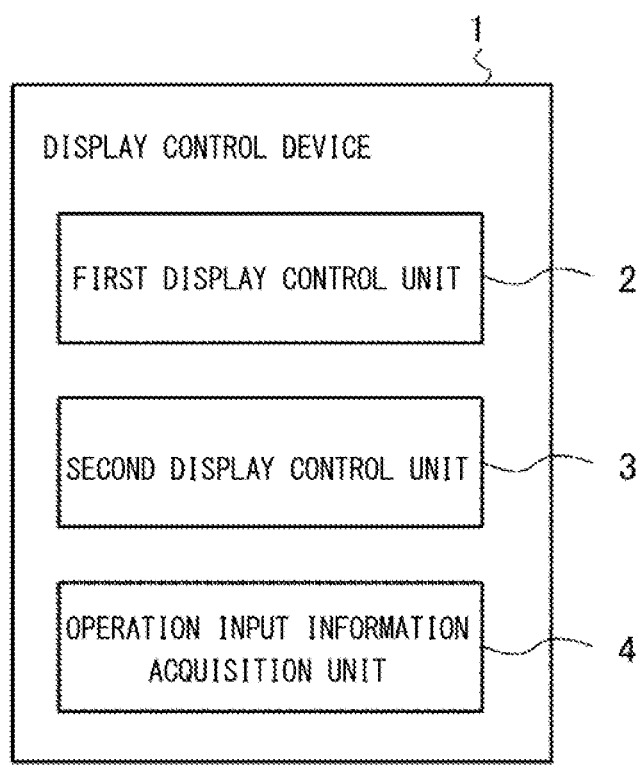
FIG. 1 is a block diagram illustrating one example of a configuration of a display control device according to an outline of an example embodiment.

Prior to a detailed description of example embodiments, an outline of the example embodiments will be described. FIG. 1 is a block diagram illustrating one example of a configuration of a display control device 1 according to an outline of an example embodiment. As illustrated in FIG. 1, the display control device 1 has a first display control unit 2, a second display control unit 3, and an operation input information acquisition unit 4.

The first display control unit 2 performs control so as to display a page, which is being displayed in a real space, in a first material as a presentation material used in a presentation by a presenter in a first position (in other words, a first display region) in a virtual reality space. For example, the first display control unit 2 performs control so as to display a page of a presentation material, which is presently displayed on a predetermined display device, in a first position in a virtual reality space in a head mounted display worn by a viewer. A display content of the predetermined display device, that is, the page of the presentation material, which is displayed on the display device, changes in accordance with progress of the presentation by the presenter, for example, by an operation by the presenter or his/her assistant. A display content in the first position in the virtual reality space is synchronized with the display content of the above predetermined display device and thus proceeds in accordance with the progress of the presentation regardless of an intention of the viewer.

The second display control unit 3 performs control so as to display a second material in a second position (in other words, a second display region) in the same virtual reality space as the above-described virtual reality space. Here, the second position (second display region) is different from the first position (first display region). For example, the second position (second display region) is positioned next to the first position (first display region). That is, the second position (second display region) is positioned within a range in which the distance from the first position (first display region) is in advance defined. Note that the second material is the same material as the presentation material set as a display object in the first position, for example, but may be another material than the presentation material.

The operation input information acquisition unit 4 acquires operation input information which is input by a viewer experiencing the virtual reality space and is about display of the above second material. For example, the operation input information acquisition unit 4 receives the operation input information transmitted from the head mounted display and thereby acquires that.

Then, the second display control unit 3 changes a display manner of the second material based on this acquired operation input information.

For example, the second display control unit 3 may change pages of the second material as display objects based on this operation input information. Further, the second display control unit 3 may change a display size of the second material based on this operation input information. Further, the second display control unit 3 may change a display position of the second material based on this operation input information.

The display control device 1 simultaneously displays a page to which the presenter presently refers for a presentation and a desired page of a material to which the viewer presently desires to refer in the virtual reality space. Furthermore, the viewer is capable of changing a display manner of the material to which the viewer presently desires to refer. Here, because the material to which the viewer presently desires to refer is displayed in the virtual reality space, the display position of the material can be set regardless of a viewing position of the viewer in the real space. Thus, the display control device 1 can improve convenience of a viewer of a presentation in browsing materials. For example, in particular, in a case where the second position (second display region) is set adjacently to the first position (first display region), the viewer can easily browse both materials.

Next, details of the example embodiment will be described.

First Example Embodiment

Figure 2:
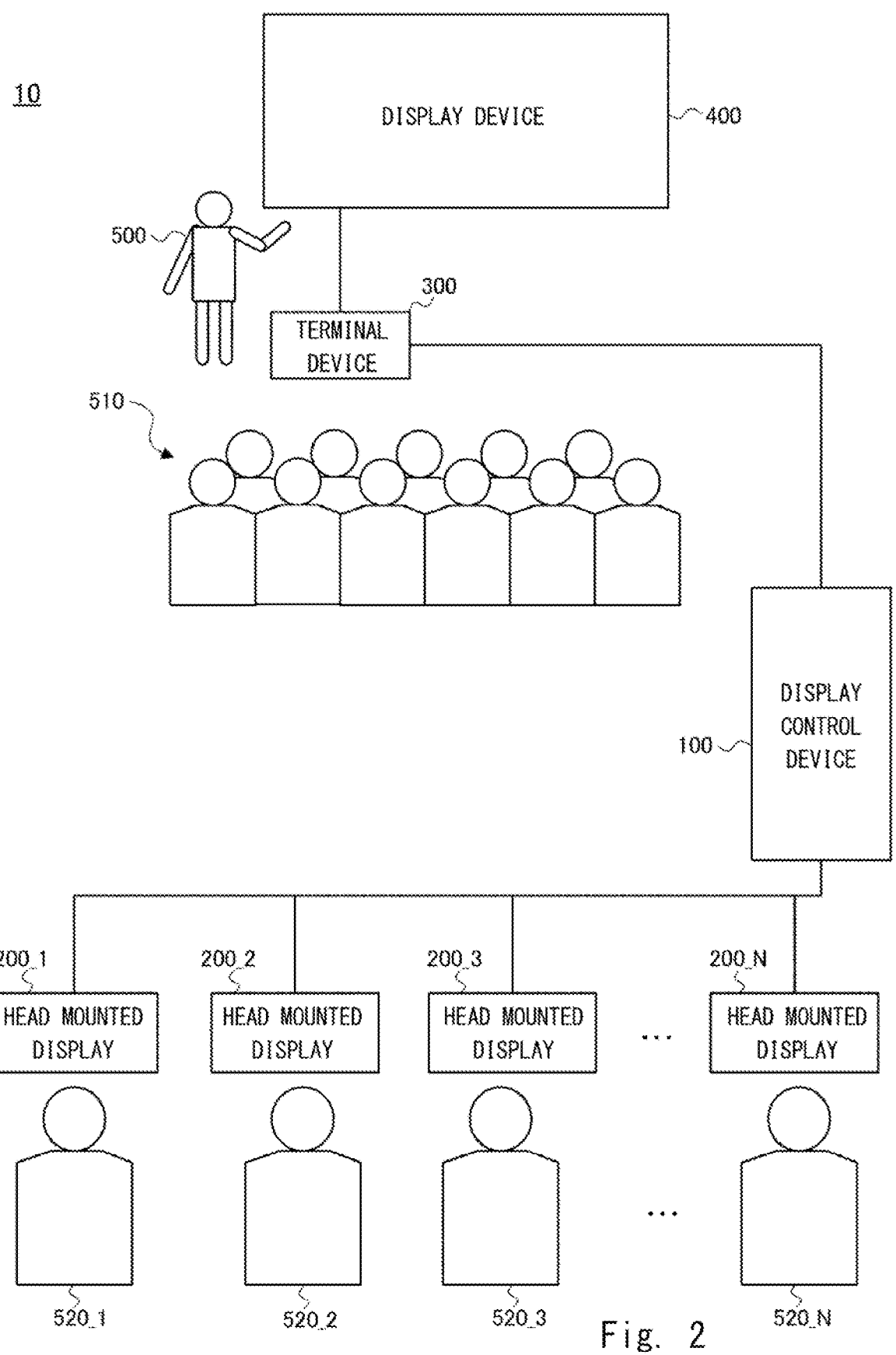
FIG. 2 is a schematic diagram illustrating one example of a configuration of a presentation system according to the example embodiment.

FIG. 2 is a schematic diagram illustrating one example of a configuration of a presentation system 10 according to an example embodiment.

The presentation system 10 includes a display control device 100, a head mounted display 200_1, a head mounted display 200_2, . . . a head mounted display 200_N, a terminal device 300, and a display device 400. Here, N denotes an integer that is one or greater. In the following description, in a case where the head mounted display 200_1, the head mounted display 200_2, . . . the head mounted display 200_N are mentioned without being particularly distinguished, those will be referred to as the head mounted display 200.

Note that for facilitating understanding, FIG. 2 illustrates a presenter 500 as a person who performs a presentation and viewers 510 and 520_1, 520_2, . . . 520_N.

In FIG. 2, the viewer 510 is a viewer who attends a presentation while seeing a material displayed on the display device 400. Further, the viewers 520_1, 520_2, . . . 520_N are viewers who wear the head mounted display 200 and attend the presentation in a virtual reality space projected by the head mounted display 200. In the following description, in a case where the viewers 520_1, 520_2, . . . 520_N are mentioned without being particularly distinguished, they will be referred to as viewer 520.

The presentation system 10 is a system used for presentations such as lectures and conferences, for example.

The display control device 100 is a control device which controls display on the head mounted display 200 and corresponds to the display control device 1 in FIG. 1. The display control device 100 is connected with the head mounted display 200 and the terminal device 300 in a wired or wireless manner so as to be capable of communication. Note that details of the display control device 100 will be described later.

The head mounted display 200 is a display device which is worn on the head of the viewer 520 and causes the viewer 520 to experience a virtual reality space. As the head mounted display 200, an arbitrary head mounted display may be used which is capable of displaying a virtual reality space. For example, the head mounted display 200 includes a display to be arranged in front of the eyes of the viewer 520 and a motion sensor detecting a motion of the head mounted display 200 (a motion of the head of the viewer 520). Note that this motion sensor is an inertial measurement unit (IMU) such as a velocity sensor or a gyroscope, for example. Accordingly, motions such as an orientation and an inclination of the head mounted display 200 are detected.

A picture is generated by the display control device 100, and a picture output from the display control device 100 is displayed on the display of the head mounted display 200.

Further, the head mounted display 200 includes an input interface accepting an operation input by the viewer 520. This input interface may be built in the head mounted display 200 or may be connected with the head mounted display 200.

As the input interface, an arbitrary input interface may be used which is capable of accepting the operation input by the viewer 520. For example, the input interface may be an eye-tracking sensor (sight line tracking sensor) or may be a motion sensor detecting a gesture such as a motion of a hand or a finger of the viewer 520. Further, the input interface may be an operation stick, a keyboard, a mouse, or the like. In addition, in a case where the motion of the head of the viewer 520 (specifically, a motion of the head of the viewer 520 in an up-down direction, or the like, for example) is linked with the operation input, the above-described motion sensor detecting the motion of the head mounted display 200 may be used as the input interface.

The terminal device 300 is connected with the display device 400 and the display control device 100 in a wired or wireless manner so as to be capable of communication. The terminal device 300 is an information processing device for outputting a presentation material to the display device 400.

The terminal device 300 outputs an image of an arbitrary page of a presentation material to the display device 400. Furthermore, the terminal device 300 includes an input interface such as a mouse and outputs to the display device 400 an image of an appropriate page corresponding to progress of a presentation in accordance with an operation input by the presenter 500 or his/her assistant or the like.

The display device 400 is connected with the terminal device 300 in a wired or wireless manner so as to be capable of communication. The display device 400 is a display which displays an image received from the terminal device 300. The display device 400 may be a flat panel display such as a liquid crystal display or may be a projector which projects an image on a screen.

Next, the display control device 100 will be described.

Figure 3:
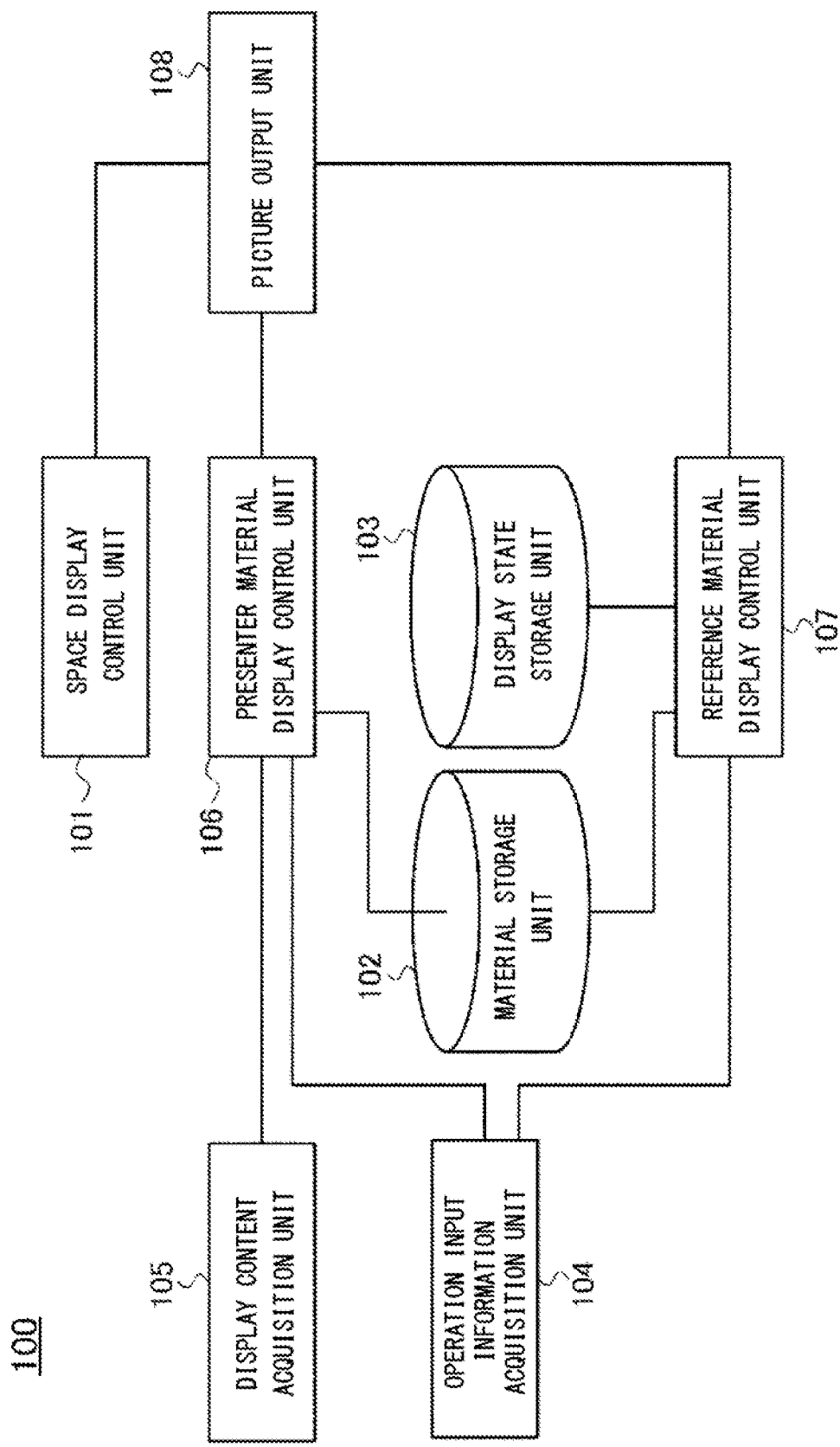
FIG. 3 is a block diagram illustrating one example of a function configuration of a display control device according to a first example embodiment.

FIG. 3 is a block diagram illustrating one example of a function configuration of the display control device 100 according to the first example embodiment.

The display control device 100 has a space display control unit 101, a material storage unit 102, a display state storage unit 103, an operation input information acquisition unit 104, a display content acquisition unit 105, a presenter material display control unit 106, a reference material display control unit 107, and a picture output unit 108.

The space display control unit 101 performs control so as to display a virtual reality space in the head mounted display 200. The space display control unit 101 may change display of the virtual reality space in accordance with the motion of the head mounted display 200 which is detected by the head mounted display 200. Further, the space display control unit 101 may change the display of the virtual reality space in accordance with an operation input by the viewer 520.

Further, the space display control unit 101 may perform control so as to display a menu described later in the virtual reality space. The menu is displayed in each of the head mounted displays 200, for example. Further, the space display control unit 101 may control display of the menu in accordance with the operation input by the viewer 520.

Further, the space display control unit 101 may perform control so as to display an avatar of the presenter 500. Note that the display of this avatar may be changed while reflecting a gesture of the presenter 500. In this case, an actual gesture of the presenter 500 is acquired by a motion capture device such as a camera or a motion sensor, and acquired gesture information is input to the display control device 100. Then, the space display control unit 101 controls the display so as to move the avatar in accordance with the gesture information.

The material storage unit 102 in advance stores an electronic file of a material to be displayed in the virtual reality space. This electronic file may be a presentation material (a material to be displayed on the display device 400) to be used in a presentation by the presenter 500, for example, or may be another material which is different from that.

Further, the display state storage unit 103 stores display state data. Details of the display state data will be described later.

The operation input information acquisition unit 104 acquires operation input information as information which indicates an operation content input via the input interface of the head mounted display 200. The operation input information acquisition unit 104 receives the operation input information output from the head mounted display 200, for example, and thereby acquires that.

The display content acquisition unit 105 acquires a present display content in the display device 400. For example, the display content acquisition unit 105 acquires the present display content in the display device 400 by receiving that from the terminal device 300. Specifically, for example, the display content acquisition unit 105 acquires content specifying information as information for specifying a display content (for example, a file name, a page number of a page being displayed, and so forth). Note that the display content acquisition unit 105 may acquire image data that the terminal device 300 outputs to the display device 400 instead of the content specifying information.

The presenter material display control unit 106 corresponds to the first display control unit 2 in FIG. 1. The presenter material display control unit 106 performs control so as to display the present display content in the display device 400 in a predetermined coordinate position (the above-described first position) in the virtual reality space in accordance with information acquired by the display content acquisition unit 105. For example, the presenter material display control unit 106 acquires the presentation material specified by the content specifying information from the material storage unit 102 and performs control so as to display the image of the page specified by the content specifying information in the virtual reality space. Note that in a case where the display content acquisition unit 105 acquires the image which is presently displayed by the display device 400, the presenter material display control unit 106 performs control so as to display the image in the virtual reality space.

The reference material display control unit 107 corresponds to the second display control unit 3 in FIG. 1. The reference material display control unit 107 displays a material stored in the material storage unit 102 in the virtual reality space. Note that a material displayed by the reference material display control unit 107 will be referred to as the reference material in the following description. The reference material corresponds to the above-described second material.

In the present example embodiment, an initial display position (the above-described second position) of the reference material is a predetermined position adjacent to the presentation material displayed in the virtual reality space by the presenter material display control unit 106. However, in the present example embodiment, the display position of the reference material can be changed by an operation by the viewer 520.

As the reference material, the reference material display control unit 107 may display the presentation material or may display a different material from the presentation material. In a case where the reference material is the presentation material, the viewer 520 can browse a desired page of the presentation material by an operation. Similarly, in a case where the reference material is another material than the presentation material, the viewer 520 can browse a desired page of the material by an operation. In other words, in a presentation, the viewer 520 can refer to a desired content regardless of the page to which the presenter 500 presently refers.

For example, the reference material display control unit 107 acquires a material which is a display object as the reference material from the material storage unit 102 and performs control so as to display that in the virtual reality space. Note that in a case where the reference material to be displayed is another material than the presentation material, the reference material display control unit 107 may acquire another material defined in advance than the presentation material from the material storage unit 102 or may acquire a material selected by an operation by the viewer 520 from the material storage unit 102. In a case where a material selected by an operation by the viewer 520 is displayed, for example, the reference material display control unit 107 selects a material based on the operation input information indicating an operation input for selecting the reference material.

Further, the reference material display control unit 107 changes a display manner of the reference material based on the operation input information about display of the reference material, which is acquired by the operation input information acquisition unit 104.

For example, the operation input information about display of the reference material is the operation input information which gives an instruction to change object pages to be displayed. In a case where such operation input information is transmitted from the head mounted display 200, the reference material display control unit 107 performs control so as to change pages of the reference material to be displayed in the head mounted display 200 in accordance with the operation input information. Accordingly, the viewer 520 wearing the head mounted display 200 can freely change pages to be browsed.

Further, for example, the operation input information about display of the reference material is the operation input information which gives an instruction to change the display size of the reference material. In a case where such operation input information is transmitted from the head mounted display 200, the reference material display control unit 107 performs control so as to change the display size of the reference material to be displayed in the head mounted display 200 in accordance with the operation input information. Accordingly, the viewer 520 wearing the head mounted display 200 can freely change the display size of the reference material.

Further, for example, the operation input information about display of the reference material is the operation input information which gives an instruction to change the display position of the reference material. In a case where such operation input information is transmitted from the head mounted display 200, the reference material display control unit 107 performs control so as to change the display position of the reference material to be displayed in the head mounted display 200 in accordance with the operation input information. Accordingly, the viewer 520 wearing the head mounted display 200 can freely change the display position of the reference material.

Note that the operation input information is information corresponding to the operation input which is input by the viewer 520 via the input interface of the head mounted display 200. As described above, the operation input may be made by the sight line of the viewer 520, may be made by a gesture by the head, a hand, or the like, and may be an operation by an operation stick, a keyboard, a mouse, or the like.

For example, display pages of the reference material may be changed in accordance with a motion of the head (hand) of the viewer 520. That is, for example, in a case where the operation input information acquisition unit 104 acquires the operation input information indicating that the viewer 520 swings the head (hand) in a predetermined direction, the reference material display control unit 107 may move the page of the reference material, which is presently displayed, forward (backward) by one page.

Further, for example, an operation content indicated by a menu item which corresponds to a pointed position detected by a pointing device such as a sight line tracking sensor, an operation stick, or a mouse or an operation content indicated by a menu item which is designated by a keyboard may be acquired as the operation input information.

Note that those are merely examples of the operation input. That is, the operation input information acquisition unit 104 may acquire information indicating a predetermined operation, which is input by the viewer 520, by an arbitrary method.

Further, a display manner to be changed by the operation input information is not limited to the above-described changes in the display manner. For example, the reference material display control unit 107 may replicate display of the reference material in accordance with the operation input information.

Further, in the present example embodiment, as one example, the reference material display control unit 107 manages the display state data indicating a display state of the reference material in the virtual reality space and thereby realizes display corresponding to the operation input information.

FIG. 4 is a diagram illustrating an example of the display state data stored in the display state storage unit 103.

The display state data are data representing the display state of the reference material which is presently displayed on each of the head mounted displays 200. As illustrated in FIG. 4, for example, the display state data include a state ID, a material ID, a user ID, coordinates, a magnification, and a page number.

The state ID is an identifier which identifies the display state data.

The material ID is an identifier which identifies the reference material being displayed, and the material ID specifies the reference material which is presently displayed.

The user ID is an identifier that identifies for which head mounted display 200 (viewer 520) display is performed.

Coordinate data configuring the display state data are coordinate data indicating the display position of the reference material and are formed with first coordinates indicating the coordinates of a left upper end portion of the reference material in the virtual reality space and second coordinates indicating the coordinates of a right lower end portion of the reference material in the virtual reality space. Those coordinates are configured with (x coordinate, y coordinate, z coordinate) of the virtual reality space as a three-dimensional space.

The magnification indicates a present display magnification of the reference material. The page number indicates which page of the reference material is displayed.

For example, in a case where the operation input information acquisition unit 104 acquires the operation input information which gives an instruction to move the page of the reference material by one page, the reference material display control unit 107 specifies the page to be displayed anew based on the present page number indicated by the display state data. Then, when the display manner is changed, the reference material display control unit 107 updates the page number in the display state data.

Further, for example, in a case where the operation input information acquisition unit 104 acquires the operation input information which gives an instruction to enlarge the display size of the reference material, the reference material display control unit 107 calculates a new magnification and a display position based on the present magnification and display position which are indicated by the display state data. Then, when the display manner is changed, the reference material display control unit 107 updates those pieces of information in the display state data.

Further, for example, in a case where the operation input information acquisition unit 104 acquires the operation input information which gives an instruction to change the display position of the reference material in the virtual reality space, the reference material display control unit 107 calculates a new display position based on the present display position indicated by the display state data. Then, when the display manner is changed, the reference material display control unit 107 updates the display position in the display state data.

The picture output unit 108 outputs a picture to the head mounted display 200, the picture conforming to control by the space display control unit 101, the presenter material display control unit 106, and the reference material display control unit 107. Picture data transmitted from the picture output unit 108 are received by the head mounted display 200 and are displayed to the viewer 520 in the head mounted display 200.

Figure 5:
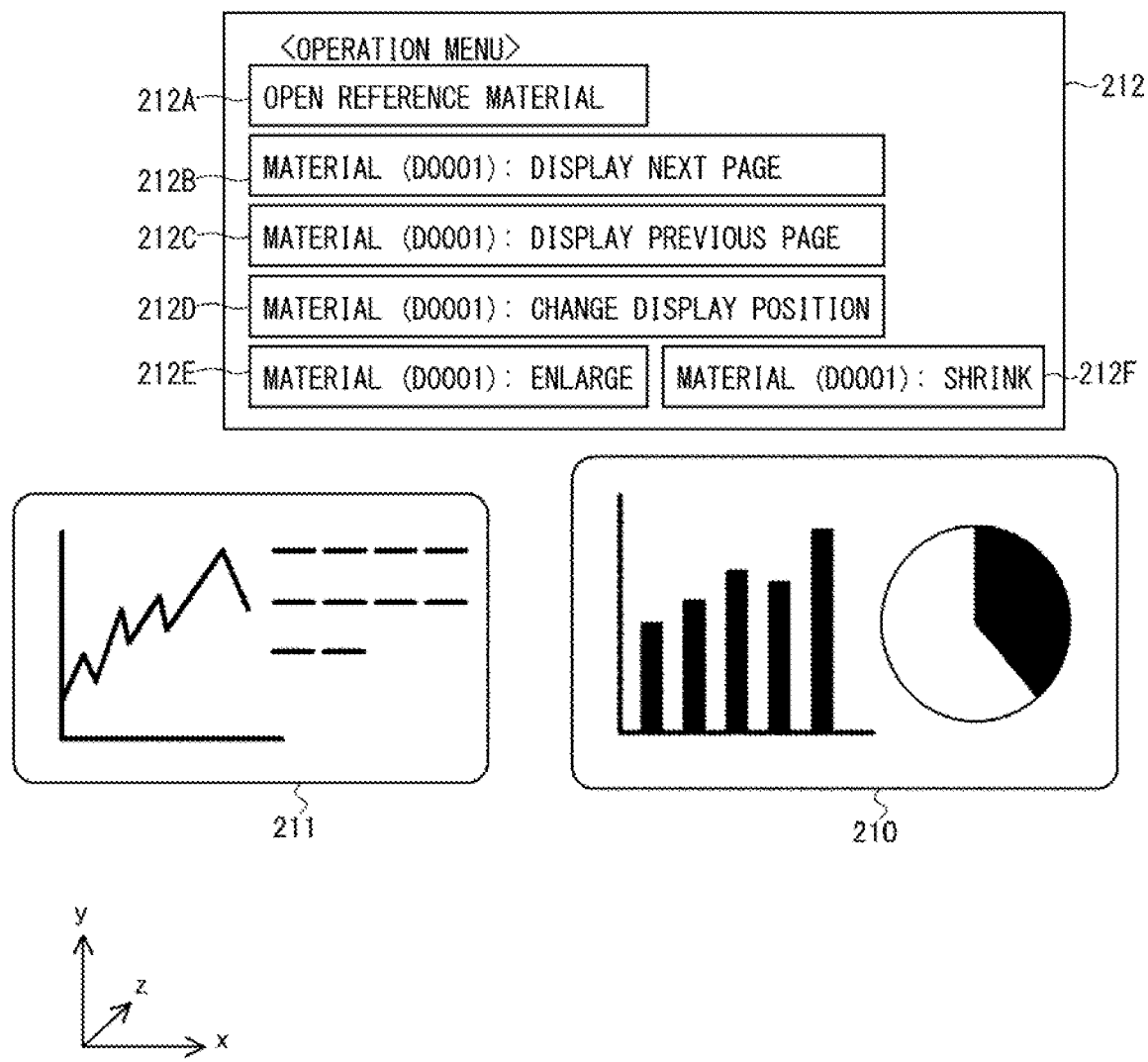
FIG. 5 is a schematic diagram illustrating one example of a picture to be displayed in a head mounted display according to the first example embodiment.

FIG. 5 is a schematic diagram illustrating one example of a picture to be displayed in the head mounted display 200.

In FIG. 5, display 210 denotes the presentation material which is displayed by control by the presenter material display control unit 106. That is, the display content of the display 210 is synchronized with the display content of the display device 400. In other words, pages of the display 210 are changed in accordance with the progress of the presentation, regardless of an intention of the viewer 520.

Further, in FIG. 5, display 211 denotes the reference material (for example, a material with a material ID of D0001) which is displayed by control by the reference material display control unit 107. The display 211 represents an arbitrary page of the presentation material which is displayed as the display 210, for example. Further, for example, as illustrated in FIG. 5, the initial display position of the reference material (the initial display position of the display 211) is a position adjacent to the display 210. In a case where the reference material display control unit 107 uses such a position as the initial display position, the viewer 520 can easily browse the presentation material to which the presenter 500 is referring and a material to which the viewer 520 him/herself desires to refer.

Further, in the example illustrated in FIG. 5, in addition to the display 210 and the display 211, display 212 is displayed in the virtual reality space. The display 212 denotes a menu for the operation input about display of the reference material.

For example, the viewer 520 designates a menu item 212A by a pointing device, designates a submenu (not illustrated), which is thereafter displayed, by the pointing device, and can thereby select the reference material to be displayed in the virtual reality space.

Further, for example, the viewer 520 designates a menu item 212B or a menu item 212C by the pointing device, and pages of the display 211 are thereby switched.

Further, for example, the viewer 520 designates a menu item 212D by the pointing device, and the display position of the display 211 in the virtual reality space is thereby changed. For example, the reference material display control unit 107 may change the display position to a predetermined position or to a position designated by the pointing device.

Further, for example, the viewer 520 designates a menu item 212E or a menu item 212F by the pointing device, and the size of the display 211 is thereby changed. The changed size may be a predetermined size or may be designated by the operation input.

Note that the display of the menu which is illustrated in FIG. 5 is one example, and a menu with other contents may be displayed. Further, in a case where the operation input is performed by a gesture, for example, display of a menu may be omitted.

Figure 6:
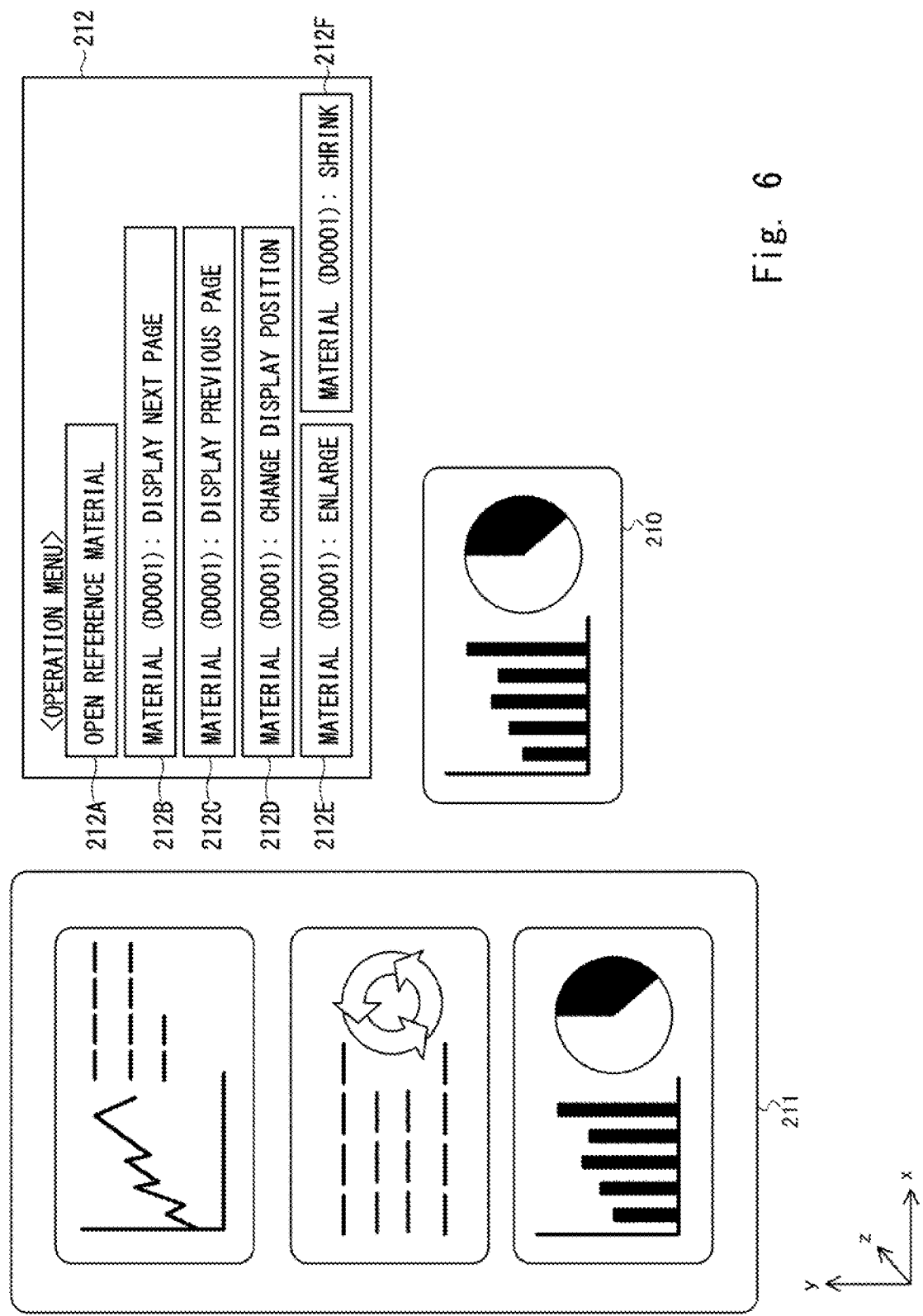
FIG. 6 is a schematic diagram illustrating another example of the picture to be displayed in the head mounted display according to the first example embodiment.

FIG. 6 is a schematic diagram illustrating another example of the picture to be displayed in the head mounted display 200.

In the example illustrated in FIG. 5, the display 211 displays an image of one page of the reference material. Differently, in the example illustrated in FIG. 6, the display 211 displays an image of plural pages of the reference material. In such a manner, the reference material display control unit 107 may simultaneously display plural pages of the reference material.

Note that in the examples illustrated in FIG. 5 and FIG. 6, for understanding of the present example embodiment, coordinate axes formed with x axis, y axis, and z axis are also illustrated. However, the setting of the coordinate axes is one example, and another setting of directions of the axes may be made. Further, in the examples illustrated in FIG. 5 and FIG. 6, although the avatar of the presenter 500 is not illustrated, the avatar of the presenter 500 may further be displayed as described above. Note that as for those matters, the same applies to the drawings referred to in a second example embodiment and the drawings referred to in a third example embodiment.

Next, a description will be made about a hardware configuration of the display control device 100.

Figure 7:
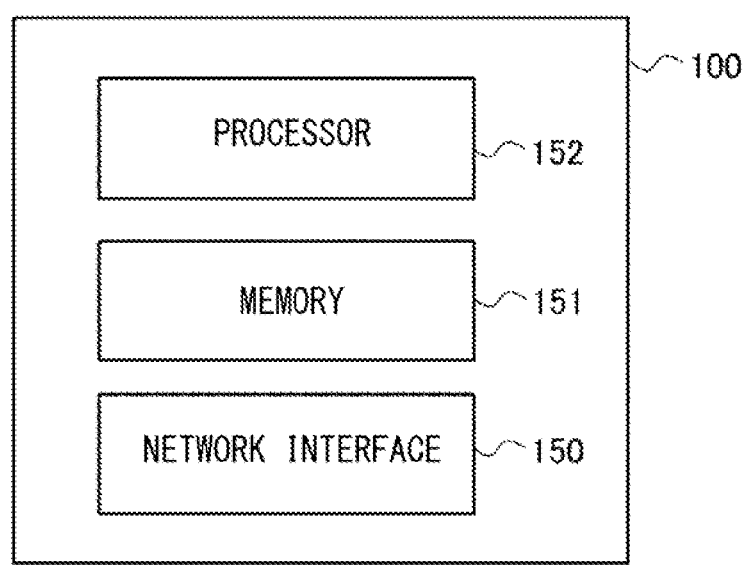
FIG. 7 is a block diagram illustrating one example of a hardware configuration of a display control device according to an example embodiment.

FIG. 7 is a block diagram illustrating one example of the hardware configuration of the display control device 100. As illustrated in FIG. 7, the display control device 100 is configured as a server having a network interface 150, a memory 151, and a processor 152, for example.

The network interface 150 is used for performing communication with the head mounted display 200 and the terminal device 300. The network interface 150 may include a network interface card (NIC), for example.

The memory 151 is configured with a combination of a volatile memory and a non-volatile memory, for example. The memory 151 is used for storing software (computer programs) or the like including one or more instructions to be executed by the processor 152.

Those programs are stored by using various types of non-transitory computer-readable media and can be supplied to a computer. Non-transitory computer-readable media include various types of tangible recording media (tangible storage media). Examples of non-transitory computer readable media include magnetic recording media (for example, a flexible disk, a magnetic tape, and a hard disk drive), magneto-optical recording media (for example, a magneto-optical disk), a compact disc read-only memory (CD-ROM), a CD-R, a CD-R/W, and semiconductor memories (for example, a mask ROM, a programmable ROM (PROM), an erasable PROM (EPROM), a flash ROM, and a random-access memory (RAM)). Further, programs may be supplied to a computer by various types of transitory computer-readable media. Examples of transitory computer-readable media include an electric signal, an optical signal, and an electromagnetic wave. A transitory computer readable medium can supply a program to a computer via a wired communication path such as an electric wire or an optical fiber or a wireless communication path.

The processor 152 may be a microprocessor, an MPU (microprocessor unit), a CPU (central processing unit), or the like, for example. The processor 152 may include plural processors.

The processor 152 reads out and executes programs from the memory 151 and thereby performs processes of the space display control unit 101, the operation input information acquisition unit 104, the display content acquisition unit 105, the presenter material display control unit 106, the reference material display control unit 107, and the picture output unit 108. Note that the material storage unit 102 and the display state storage unit 103 of the display control device 100 are realized by the memory 151 or a storage device (not illustrated).

As described above, the display control device 100 functions as a computer. Note that the head mounted display 200, the terminal device 300, and the display device 400 may also have a hardware configuration as illustrated in FIG. 7. That is, those may have a function as a computer, and a processor may execute various processes by executing programs.

Next, a description will be made about an action example of display of the reference material.

Figure 8:
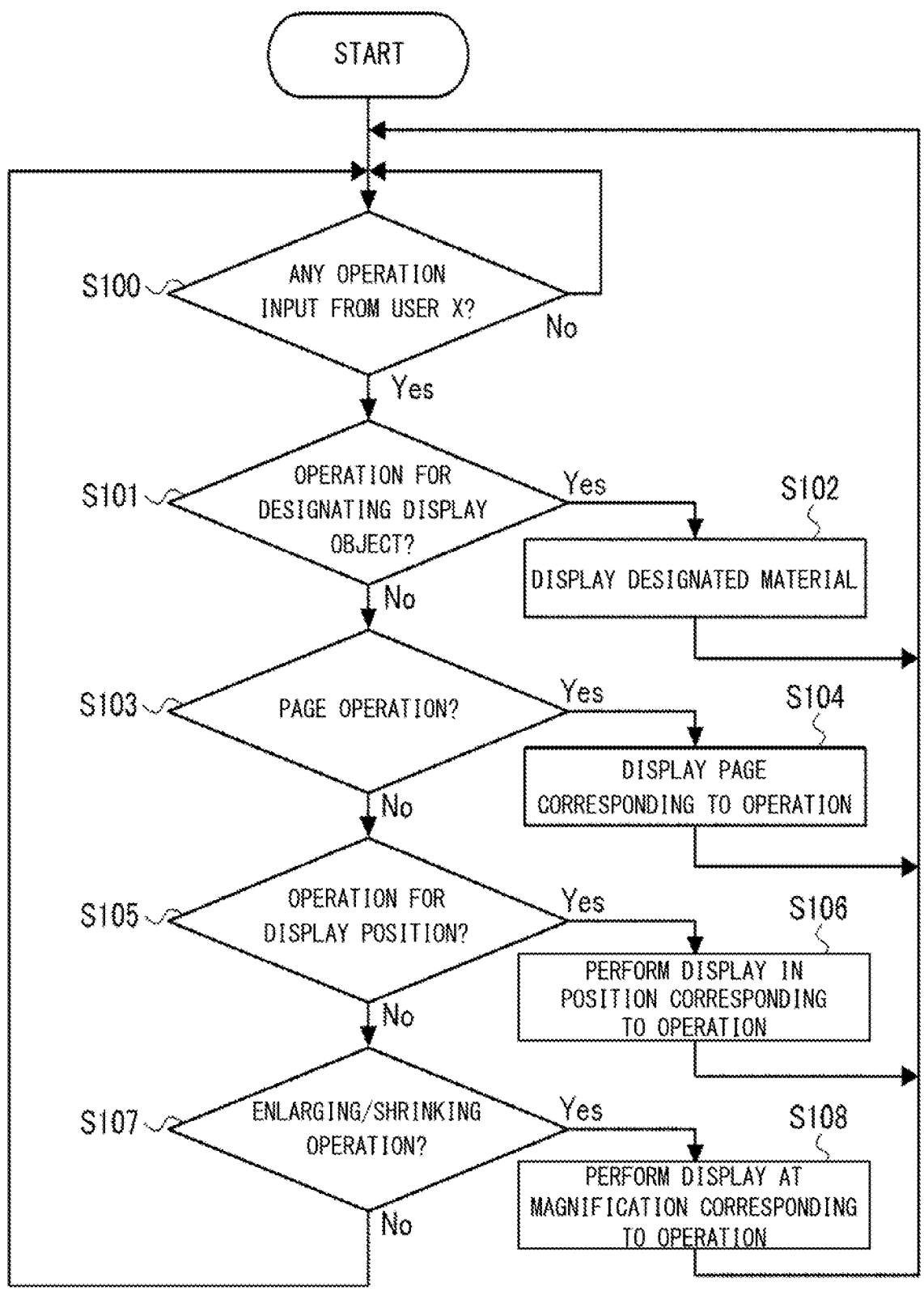
FIG. 8 is a flowchart illustrating one example of an action of a reference material display control unit according to the first example embodiment.

FIG. 8 is a flowchart illustrating one example of an action of the reference material display control unit 107. FIG. 8 illustrates display control of the reference material for the head mounted display 200 worn by any one of the viewers 520 (here, referred to as user X). Note that the display control of the reference material is similarly performed for the head mounted displays 200 worn by the viewers 520 other than the user X. In the following, a description will be made about one example of the action of the reference material display control unit 107 along FIG. 8.

In step S100, the reference material display control unit 107 checks whether or not the operation input information acquisition unit 104 acquires the operation input information about the operation input from the user X. Note that the head mounted displays 200 and the viewers 520 wearing the head mounted displays 200 are managed in the display control device 100 while being in advance associated together. When the operation input information about the operation input from the user X is acquired (Yes in step S100), the process moves to step S101.

In step S101, the reference material display control unit 107 determines whether or not the acquired operation input information is the operation input information for selecting the reference material as the display object.

In a case where the acquired operation input information is the operation input information for selecting the reference material as the display object (Yes in step S101), in step S102, the reference material display control unit 107 displays the designated material as the reference material. Note that plural reference materials may be displayed.

In a case where the acquired operation input information is not the operation input information for selecting the reference material as the display object (No in step S101), the process moves to step S103.

In step S103, the reference material display control unit 107 determines whether or not the acquired operation input information is the operation input information for giving an instruction to change object pages to be displayed.

In a case where the acquired operation input information is the operation input information for giving an instruction to change object pages to be displayed (Yes in step S103), in step S104, the reference material display control unit 107 displays the page of the reference material which corresponds to the operation.

In a case where the acquired operation input information is not the operation input information for giving an instruction to change object pages to be displayed (No in step S103), the process moves to step S105.

In step S105, the reference material display control unit 107 determines whether or not the acquired operation input information is the operation input information for giving an instruction to change the display position of the reference material.

In a case where the acquired operation input information is the operation input information for giving an instruction to change the display position of the reference material (Yes in step S105), in step S106, the reference material display control unit 107 displays the reference material in the position which corresponds to the operation.

In a case where the acquired operation input information is not the operation input information for giving an instruction to change the display position of the reference material (No in step S105), the process moves to step S107.

In step S107, the reference material display control unit 107 determines whether or not the acquired operation input information is the operation input information for giving an instruction to change the display size of the reference material.

In a case where the acquired operation input information is the operation input information for giving an instruction to change the display size of the reference material (Yes in step S107), in step S108, as for the reference material, the reference material display control unit 107 displays the reference material at the magnification which corresponds to the operation.

In a case where the acquired operation input information is not the operation input information for giving an instruction to change the display size of the reference material (No in step S107), the process returns to step S100.

Note that the flow of control illustrated in FIG. 8 is merely one example. Consequently, for example, the control may be performed in different processing order from the processing order illustrated in FIG. 8. Further, in the flowchart illustrated in FIG. 8, as changes in the display manner of the reference material, changes of pages and in the display position and size are possible, but only one kind of display manner among those may be changeable. Further, the display manners of an arbitrary combination of two kinds may be changeable.

In the above, the first example embodiment is described. In the present example embodiment, the presentation material and the reference material are simultaneously displayed in the virtual reality space independently of a viewing position of a viewer in the real space. Furthermore, the viewer 520 is capable of freely changing the display manner of the reference material. Thus, the display control device 100 can improve convenience of a viewer of a presentation in browsing materials.

Second Example Embodiment

Next, a second example embodiment will be described.

The second example embodiment is different from the first example embodiment in the point that explication information explicating a content described in a material is further displayed in a virtual reality space.

Figure 9:
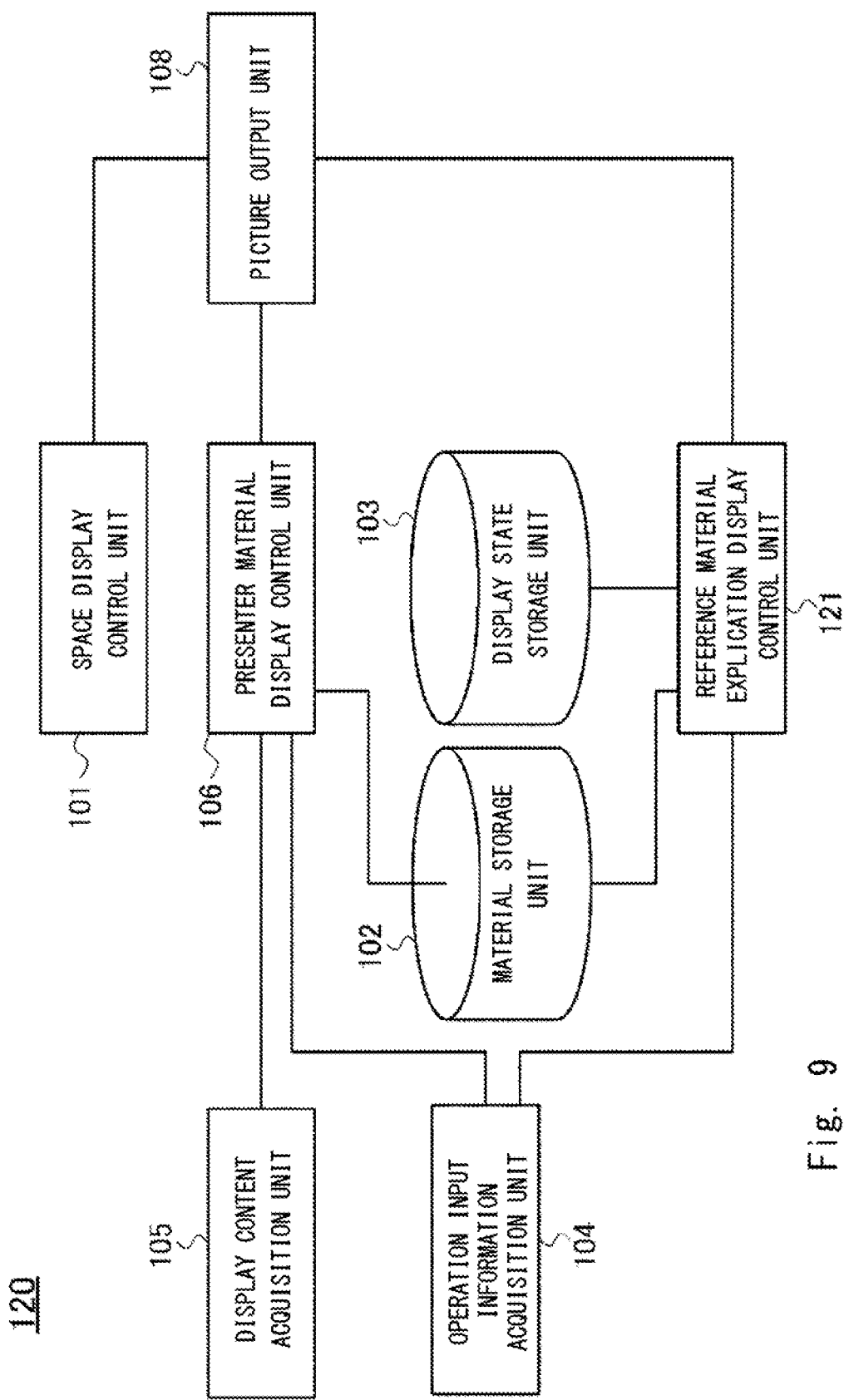
FIG. 9 is a block diagram illustrating one example of a function configuration of a display control device according to a second example embodiment.

FIG. 9 is a block diagram illustrating one example of a function configuration of a display control device 120 according to the second example embodiment. The display control device 120 is different from the above-described display control device 100 in the point that the reference material display control unit 107 is replaced by a reference material explication display control unit 121. Thus, the picture output unit 108 outputs a picture to the head mounted display 200, the picture conforming to control by the space display control unit 101, the presenter material display control unit 106, and the reference material explication display control unit 121.

Note that the display control device 120 also includes the hardware configuration illustrated in FIG. 7, the processor 152 executes a program read out from the memory 151, and a process of the reference material explication display control unit 121 is thereby realized. In the following description, configurations and actions common to the display control device 100 will not be described, but different points from the display control device 100 will be described.

The operation input information acquisition unit 104 in the present example embodiment not only acquires the operation input information about display of the reference material but also acquires the operation input information which is input by the viewer 520 experiencing the virtual reality space and designates an explication object in a content of the reference material. The viewer 520 performs the operation input for designating a part, an explication of which he/she desires to see, in the reference material displayed in the virtual reality space.

The reference material explication display control unit 121 is different from the reference material display control unit 107 in the first example embodiment in the point that that further performs display control of the explication information in addition to display control of the reference material. The reference material explication display control unit 121 displays the explication information as information explicating the explication object in the virtual reality space based on the operation input information designating the explication object in a content of the reference material.

The explication information is stored in the material storage unit 102, for example. Each piece of the explication information is stored in the material storage unit 102 while being associated with the explication object in the reference material. In this case, the reference material explication display control unit 121 reads out the explication information, which is associated with the explication object designated by the operation input information, from the material storage unit 102 and displays that in the virtual reality space. The reference material explication display control unit 121 performs control so as to display the explication information in a position in the vicinity of the explication object, for example. Further, the reference material explication display control unit 121 may display the explication information by connecting the explication object and the explication information by a line, for example, such that the correspondence relationship between those becomes clear.

Further, in particular, in the present example embodiment, the display control device 120 can display the explication information at various explication levels. Here, an explication level means a level which indicates details of an explanation content indicated by the explication information or easiness of terms indicated by the explication information. In order to enable the explication information at various explication levels to be displayed, in the present example embodiment, the operation input information acquisition unit 104 can also acquire the operation input information which is input by the viewer experiencing the virtual reality space and designates the explication level.

The reference material explication display control unit 121 performs control so as to display the explication information at a predetermined level when the operation input information designating the explication object is acquired, for example. Then, when the operation input information designating the explication level is acquired, the reference material explication display control unit 121 performs switching to display of the explication information at the level designated by the operation input information. In this case, one explication object is stored in the material storage unit 102 while being linked with plural pieces of explication information at different explication levels.

In the present example embodiment, as one example, the reference material explication display control unit 121 manages the display state data, which indicate a display state of the reference material in the virtual reality space, and a display state of the explication information and thereby realizes display corresponding to the operation input information.

FIG. 10 is a diagram illustrating an example of display state data stored in the display state storage unit 103 according to the second example embodiment.

In FIG. 10, display state data with a state ID of S0001 and display state data with a state ID of S0002 are specific examples of the display state data indicating the display state of the reference material. Then, display state data with a state ID of S0008 are a specific example of the display state data indicating the display state of the explication information (material ID: D0001-a007). The explication information with a material ID of D0001-a007 is the explication information about a reference material with a material ID of D0001, for example.

As illustrated in FIG. 10, the display state data indicating the display state of the explication information include not only the state ID, the material ID, the user ID, the coordinates, the magnification, and the page number but also a level. A level indicates the explication level of the explication information which is presently displayed.

For example, in a case where the operation input information acquisition unit 104 acquires the operation input information which gives an instruction to raise the explication level by one stage, the reference material explication display control unit 121 specifies the explication information to be displayed anew based on the present explication level indicated by the display state data. Then, when the display manner is changed, the reference material explication display control unit 121 updates the level in the display state data.

Note that as illustrated in FIG. 10, in the present example embodiment, for the explication information also, coordinates, a magnification, and a page number are managed as the display state data. Consequently, similarly to the reference material, the display manner of the explication information may also be changed in accordance with the operation input information about the explication information, which is acquired by the operation input information acquisition unit 104.

Figure 11:
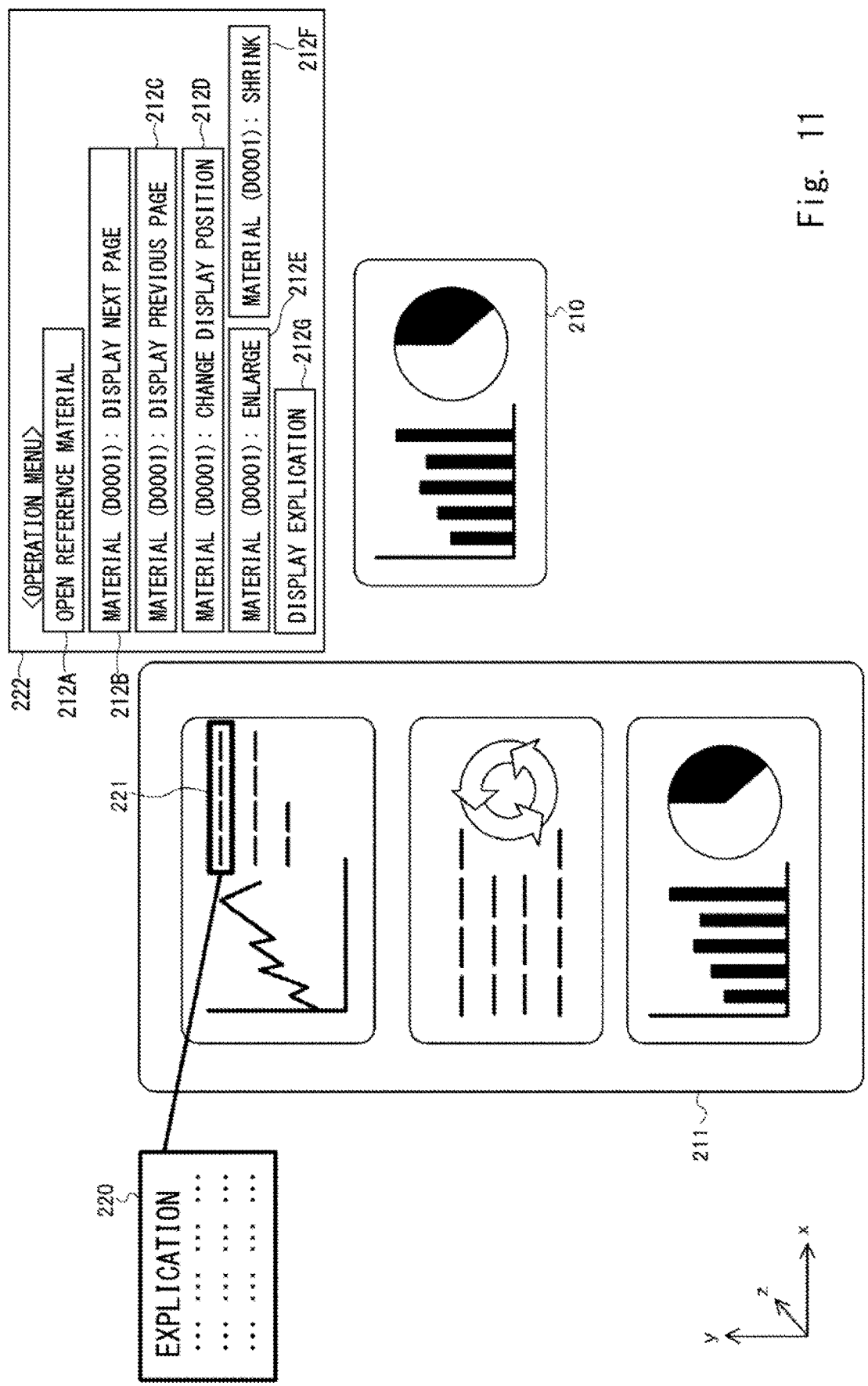
FIG. 11 is a schematic diagram illustrating one example of a picture to be displayed in a head mounted display according to the second example embodiment.

FIG. 11 is a schematic diagram illustrating one example of a picture to be displayed in the head mounted display 200 according to the second example embodiment.

In FIG. 11, display 210 denotes the presentation material which is displayed by control by the presenter material display control unit 106. Further, in FIG. 11, display 211 denotes the reference material which is displayed by control by the reference material explication display control unit 121. In addition, display 220 denotes the explication information which is displayed by control by the reference material explication display control unit 121. More specifically, the display 220 represents the explication information about an explication object 221 designated by the operation input.

The display position of the display 220 is calculated by the reference material explication display control unit 121 based on the display position indicated by the display state data about the reference material, for example. For example, the reference material explication display control unit 121 calculates a position, which does not overlap with other display (for example, the display 210) but is adjacent to the explication object, as the display position of the explication information. Further, the reference material explication display control unit 121 may calculate a position adjacent to the explication object as the display position of the explication information.

Further, in the example illustrated in FIG. 11, in addition to the display 210, the display 211, and the display 220, display 222 is displayed in the virtual reality space. The display 222 denotes a menu for the operation input about display of the reference material and display of the explication information.

For example, the viewer 520 designates a menu item 212G by a pointing device and thereafter designates a position in which the explication object is displayed, that is, a position in which a description, explication of which is desired, is present by the pointing device, and the explication object is thereby designated.

Further, for example, a swipe action on the display 220 or the like by the viewer 520 is performed via a pointing device or the like, and the operation input for designating (changing) the explication level is thereby performed. Accordingly, the operation input information acquisition unit 104 acquires the operation input information designating (changing) the explication level.

Note that the above-described operation inputs for designation of the explication object and designation of the explication level are examples, but the operation input is not limited to those. For example, the reference material explication display control unit 121 may display a predetermined icon around an object for which the explication information is capable of being provided. Then, this predetermined icon is designated by a pointing device, and the explication object may thereby be designated. Note that the predetermined icon is an icon clearly indicating that explication is capable of being referred to, for example. Specifically, for example, the icon may be an icon imitating the question mark or may be an icon imitating a magnifying lens but is not limited to those.

Further, the operation input for designating the explication level may be performed by designating a menu item for designating the level by a pointing device.

As described above, as a specific method of the operation input, an arbitrary configuration is possible, and a method of the operation input is not limited to any operation input method.

Next, a description will be made about an action example of display control by the reference material explication display control unit 121 according to the present example embodiment.

Figure 12:
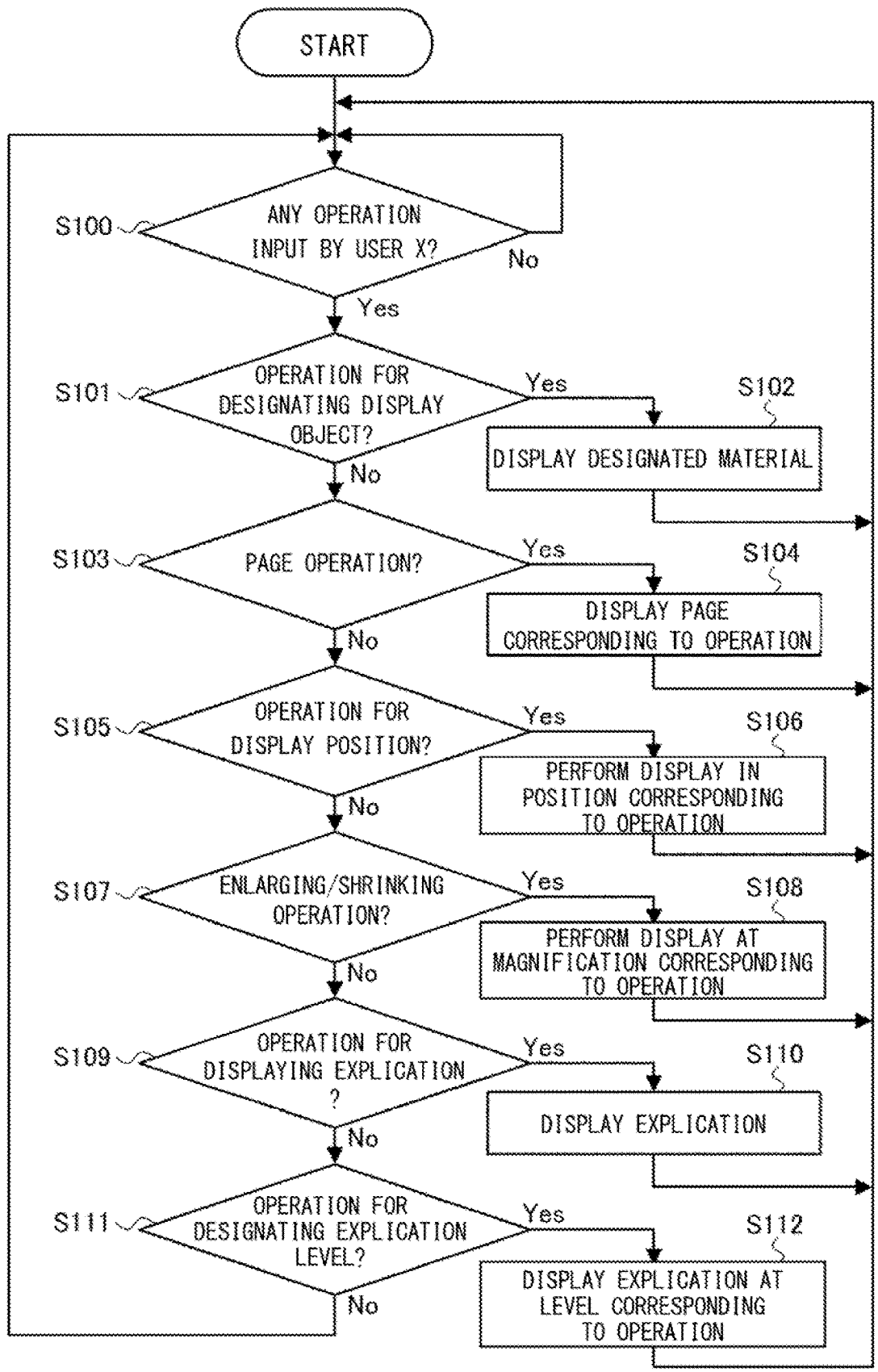
FIG. 12 is a flowchart illustrating one example of an action of a reference material explication display control unit according to the second example embodiment.

FIG. 12 is a flowchart illustrating one example of an action of the reference material explication display control unit 121. Similarly to FIG. 8, FIG. 12 illustrates display control for the head mounted display 200 worn by the user X. The display control is similarly performed for the head mounted displays 200 worn by the viewers 520 other than the user X.

Note that the flowchart illustrated in FIG. 12 is different from the flowchart illustrated in FIG. 8 in the point that control about display of the explication information is added. Specifically, the flowchart illustrated in FIG. 12 is different from the flowchart illustrated in FIG. 8 in the point that step S109 to step S112 are added. In the following, a description will be made about one example of the action of the reference material explication display control unit 121 along FIG. 12. However, descriptions common to the descriptions about FIG. 8 will not be repeated.

In the flowchart illustrated in FIG. 8, in a case of No in step S107, the process returns to step S100; however, in the flowchart illustrated in FIG. 12, the process moves to step S109.

In step S109, the reference material explication display control unit 121 determines whether or not the operation input information acquired by the operation input information acquisition unit 104 is the operation input information designating the explication object in a content of the reference material.

In a case where the acquired operation input information is the operation input information designating the explication object in the content of the reference material (Yes in step S109), in step S110, the reference material explication display control unit 121 displays the explication information corresponding to the designated explication object.

In a case where the acquired operation input information is not the operation input information designating the explication object in the content of the reference material (No in step S109), the process moves to step S111.

In step S111, the reference material explication display control unit 121 determines whether or not the operation input information acquired by the operation input information acquisition unit 104 is the operation input information designating the explication level.

In a case where the acquired operation input information is the operation input information designating the explication level (Yes in step S111), in step S112, the reference material explication display control unit 121 switches the display to the explication information at the designated level.

In a case where the acquired operation input information is not the operation input information designating the explication level (No in step S111), the process returns to step S100.

Note that the flow of control illustrated in FIG. 12 is merely one example. Consequently, for example, the control may be performed in different processing order from the processing order illustrated in FIG. 12.

Further, in the above-described example embodiment, although the explication information is in advance stored in the material storage unit 102, the explication information may be acquired from an external server (search server) via a network such as the Internet. That is, the reference material explication display control unit 121 may transmit a term as the explication object to an external server and acquire a search result by a search engine provided by this server as the explication information.

In the above, the second example embodiment is described. In the present example embodiment, the viewer 520 can browse not only the reference material but also the explication information. Further, because those are displayed in the virtual reality space, in particular, the following advantages are provided.

If the reference material and the explication information are displayed in the real space by a display of a mobile terminal, plural windows have to be displayed within the size of the display of the mobile terminal. Thus, a measure is needed such as displaying one window with another window overlapping with that or displaying windows in small display sizes such that those do not interfere with each other. This may result in display which is difficult to see. On the other hand, in the present example embodiment, the presentation material, the reference material, and the explication information are displayed in the virtual reality space. Thus, compared to a case where display is performed in the real space, it becomes possible to use a wide range for display, resulting in display which is easy to see.

Third Example Embodiment

Next, a third example embodiment will be described. The third example embodiment is different from the above-described example embodiments in the point that a comment on a material can be managed.

Figure 13:
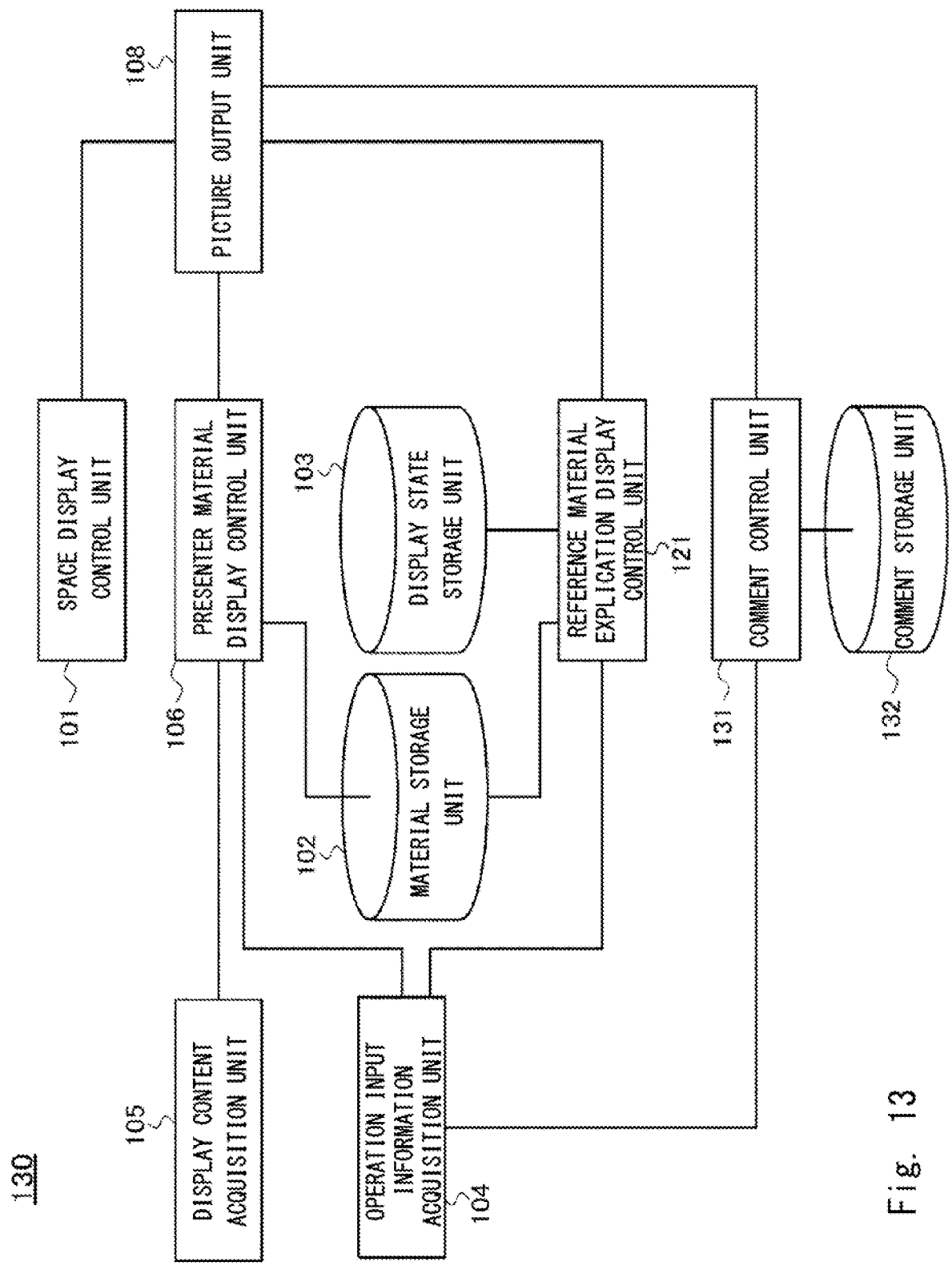
FIG. 13 is a block diagram illustrating one example of a function configuration of a display control device according to a third example embodiment.

FIG. 13 is a block diagram illustrating one example of a function configuration of a display control device 130 according to the third example embodiment.

The display control device 130 is different from the above-described display control device 120 in the point that a comment control unit 131 and a comment storage unit 132 are added. Note that the picture output unit 108 in the present example embodiment outputs a picture to the head mounted display 200, the picture conforming to control by the space display control unit 101, the presenter material display control unit 106, the reference material explication display control unit 121, and the comment control unit 131.

Note that the display control device 130 according to the third example embodiment has a display function of the explication information described as the second example embodiment but may not have the display function of the explication information.

The display control device 130 also includes the hardware configuration illustrated in FIG. 7, the processor 152 executes a program read out from the memory 151, and a process of the comment control unit 131 is thereby realized. Further, the comment storage unit 132 is realized by the memory 151 or a storage device (not illustrated).

In the following description, configurations and actions common to the display control device 120 will not be described, but different points from the display control device 100 will be described.

The operation input information acquisition unit 104 in the present example embodiment acquires not only the above-described operation input information but also the operation input information about a comment input by the viewer 520 experiencing the virtual reality space. Note that the comment may be a comment on the material set as the display object by the presenter material display control unit 106 (presentation material) or may be a comment on the reference material set as the display object by the reference material explication display control unit 121. The operation input information about the comment includes a position of a comment object in a material and a comment content. The viewer 520 performs the operation inputs for designating a part, on which he/she desires to comment, in a material displayed in the virtual reality space and for inputting a comment.

The comment control unit 131 manages the position of the comment object and the comment content which are included in the operation input information about the comment while associating those together. Specifically, the comment control unit 131 stores comment data as data in which the position of the comment object and the comment content are associated together in the comment storage unit 132 and thereby manages the comment. As described above, in the present example embodiment, the viewer 520 can provide a comment on a material. Further, the content of the provided comment is managed while being associated with the position of the comment object. Consequently, it is possible to easily specify which content in the material the provided comment is about.

Further, in the present example embodiment, in addition, when the material is displayed in the virtual reality space, the comment control unit 131 performs control so as to display the comment content corresponding to the comment object in the virtual reality space while associating the comment content with the position of the comment object in the material. Thus, the viewer 520 can also browse the comment corresponding to the material which is being displayed.

Note that in displaying comments, the comment control unit 131 may disclose the comments on a certain material to all of the viewers 520; however, in the present example embodiment, the comment control unit 131 discloses comments by the other viewers 520 only to the viewers 520 who satisfy a predetermined condition. Thus, more specifically, the display control device 130 is configured in the following manner.

The operation input information about the comment which is acquired by the operation input information acquisition unit 104 more specifically includes identification information, which identifies the viewer 520 who inputs a comment, in addition to the position of the comment object in the material and the comment content. Further, the comment control unit 131 manages this identification information, the position of the comment object, and the comment content while associating those together. Furthermore, the comment control unit 131 performs control about whether or not the comment content is displayed when the material is displayed in the virtual reality space based on the identification information associated with the comment content.

For example, the comment control unit 131 performs control so as to display the content of a comment on the head mounted display 200 of the viewer 520 linked with the identification information which is in advance associated with the identification information of an inputting person of the comment. In other words, the comment control unit 131 performs control so as not to display the content of the comment on the head mounted display 200 of the viewer 520 linked with the identification information which is not associated in advance with the identification information of the inputting person of the comment. Accordingly, the comment control unit 131 performs control such that the comment can be shared by the viewers belonging to the same group or belonging to a group with higher authority than the group has, for example.

FIG. 14 is a diagram illustrating an example of comment data stored in the comment storage unit 132. As illustrated in FIG. 14, for example, the comment data include a comment ID, a material ID, a user ID, a group ID, a page number, coordinates, and the comment content.

The comment ID is an identifier which identifies the comment data.

The material ID is an identifier which identifies the material as the comment object.

The user ID is an identifier that identifies which viewer 520 inputs the comment.

The group ID is an identifier which identifies the group to which the user ID belongs, that is, the group to which the viewer 520 inputting the comment belongs.

The page number indicates which page of the material the comment is about.

Coordinate data configuring the comment data are coordinate data indicating the position of the comment object on the page of the material and are formed with first coordinates indicating the position of a left upper end portion of the comment object and second coordinates indicating the position of a right lower end portion of the comment object. Note that the first coordinates and second coordinates in the comment data are coordinates indicating relative positions in a case where the position of the left upper end portion of the page is set as (0, 0, 0) and the position of the right lower end portion of the page is set as (1, 1, 1). Consequently, the value of each axis of the first coordinates and second coordinates in the comment data is indicated by a value of zero or greater to one or smaller.

The comment content indicates the content of an input comment.

The comment control unit 131 generates the comment data illustrated in FIG. 14 based on the operation input information about the comment, which is acquired by the operation input information acquisition unit 104, and stores the comment data in the comment storage unit 132. Note that it is assumed that the correspondence relationship between the user ID and the group ID is in advance managed by a configuration, which is not illustrated, in the display control device 130. Note that the material ID configuring the comment data may be acquired as the operation input information about the comment or may be acquired by referring to the display state data stored in the display state storage unit 103.

Further, when the comment control unit 131 generates the comment data, the comment control unit 131 displays the comment content linked with the comment data on the head mounted display 200 which is displaying the material of the material ID linked with the comment data. However, as described above, in a case where comments by the other viewers 520 are disclosed only to the viewers 520 satisfying the predetermined condition, the comment control unit 131 performs control about whether or not the comments are displayed in accordance with the identification information linked with the comment data.

In a case where a comment is displayed, the comment control unit 131 may display not only the comment content but also the identification information of the inputting person of the comment. Further, in a case where the display control device 130 manages the identification information and a user name while in advance linking those together, the comment control unit 131 may display the comment content and the name of the inputting person of the comment.

Figure 15:
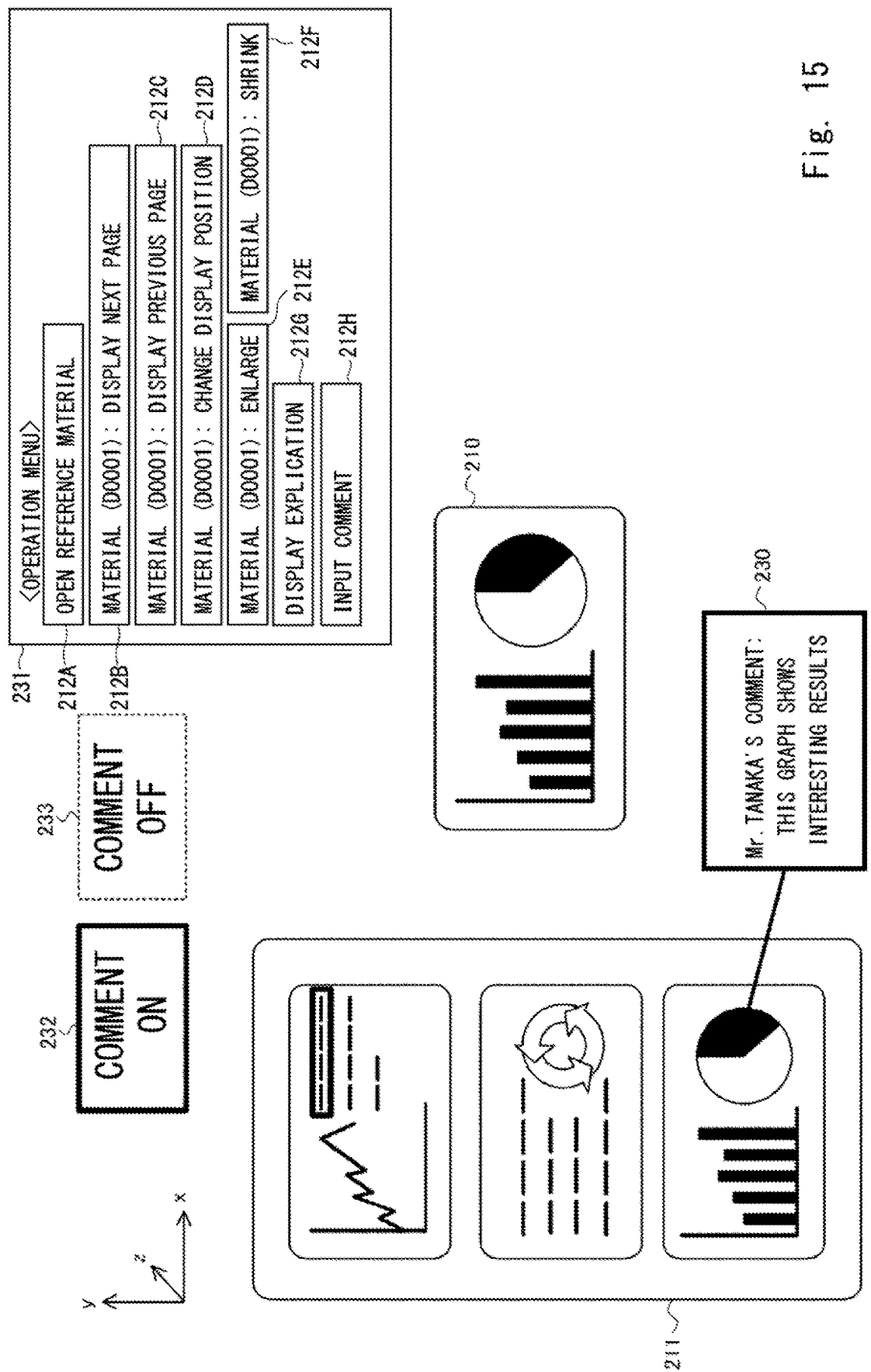
FIG. 15 is a schematic diagram illustrating one example of a picture to be displayed in a head mounted display according to the third example embodiment.

FIG. 15 is a schematic diagram illustrating one example of a picture to be displayed in the head mounted display 200 according to the third example embodiment.

In FIG. 15, display 210 denotes the presentation material which is displayed by control by the presenter material display control unit 106. Further, in FIG. 15, display 211 denotes the reference material which is displayed by control by the reference material explication display control unit 121. In addition, display 230 denotes the comment which is displayed by control by the comment control unit 131. Note that the display position of the display 230 is calculated by the comment control unit 131 based on the display position indicated by the display state data about the material as the object of the comment, for example. For example, the comment control unit 131 calculates a position adjacent to the comment object as the display position of the comment. Further, the comment control unit 131 calculates a position which does not overlap with other display (for example, the display 210) as the display position of the comment. The comment control unit 131 may display the comment by connecting the comment object and the comment by a line, for example, such that the correspondence relationship between those becomes clear.

Further, in the example illustrated in FIG. 15, in addition to the display 210, the display 211, and the display 230, display 231 is displayed in the virtual reality space. The display 231 denotes a menu for the operation input about the reference material, the explication information, and the comment.

For example, the viewer 520 designates a menu item 212H by a pointing device, designates a submenu (not illustrated), which is thereafter displayed, by the pointing device, and can thereby designate the position of the comment object and input the comment. Designation of the position of the comment object is performed by using a pointing device, for example. Further, an input of the comment is performed by using a keyboard. Note that a comment to be input does not have to be a free character string but may be selected from choices of comments which are in advance defined. In this case, the comment content is input by selecting a predetermined choice by using a pointing device.

Further, in the example illustrated in FIG. 15, in addition, display 232 and display 233 are displayed in the virtual reality space. For example, the display 232 and the display 233 are displayed by control by the comment control unit 131. The display 232 and the display 233 are icons by which the viewer 520 selects whether or not the comment is displayed. In a case where the display 232 is selected, the comment control unit 131 performs control so as to display the comment. On the other hand, in a case where the display 233 is selected, the comment control unit 131 performs control so as not to display the comment.

Next, a description will be made about an action example of display control in the third example embodiment.

Figure 16:
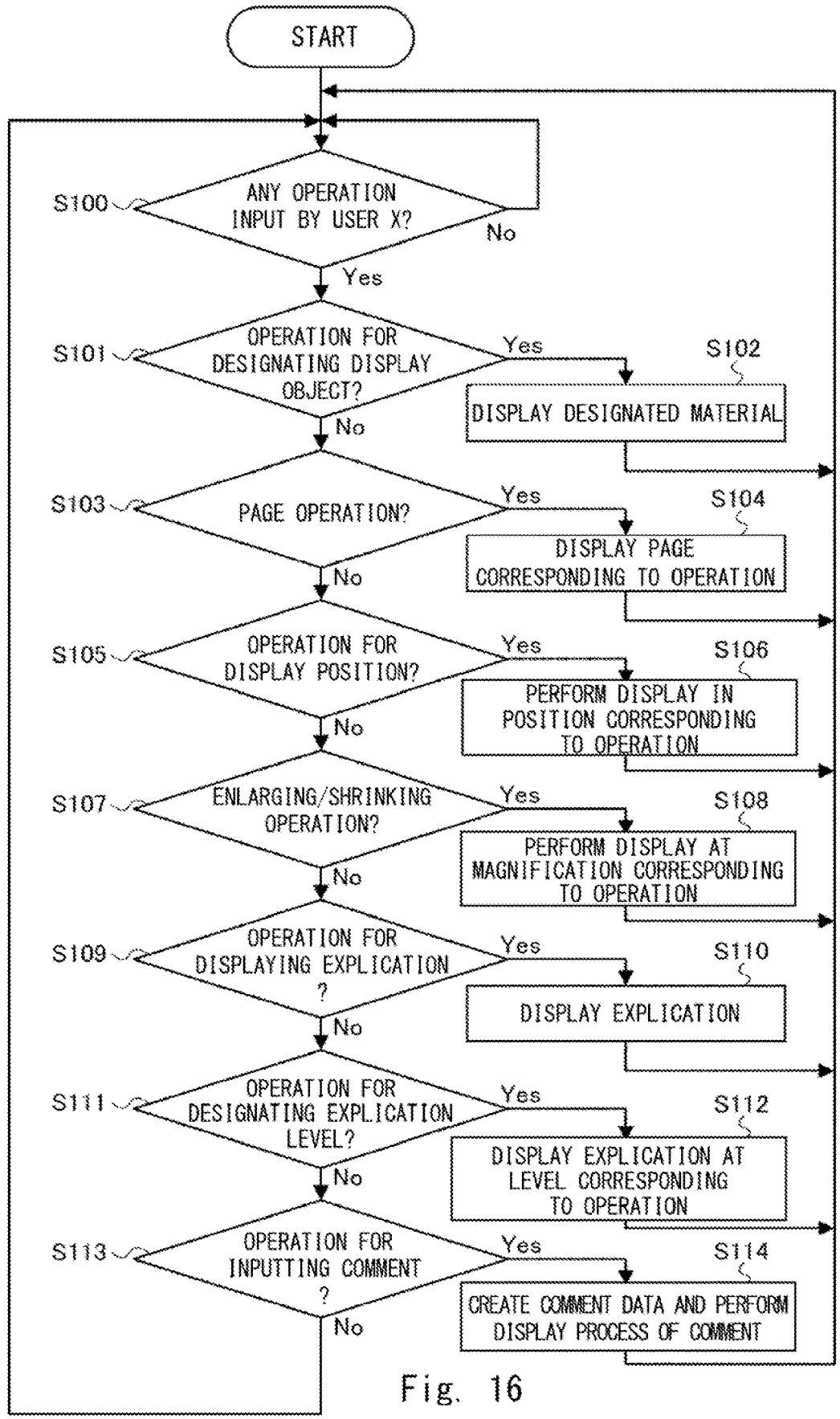
FIG. 16 is a flowchart illustrating one example of actions of a reference material explication display control unit and a comment control unit according to the third example embodiment.

FIG. 16 is a flowchart illustrating one example of actions of the reference material explication display control unit 121 and the comment control unit 131. Similarly to FIG. 8, FIG. 16 illustrates display control for the head mounted display 200 worn by the user X. The display control is similarly performed for the head mounted displays 200 worn by the viewers 520 other than the user X.

Note that the flowchart illustrated in FIG. 16 is different from the flowchart illustrated in FIG. 12 in the point that control about display of the comment is added. Specifically, the flowchart illustrated in FIG. 16 is different from the flowchart illustrated in FIG. 12 in the point that step S113 and step S114 are added. In the following, a description will be made about one example of the actions along FIG. 16. However, descriptions common to the descriptions about FIG. 12 will not be repeated.

In the flowchart illustrated in FIG. 12, in a case of No in step S111, the process returns to step S100; however, in the flowchart illustrated in FIG. 16, the process moves to step S113.

In step S113, the comment control unit 131 determines whether or not the operation input information acquired by the operation input information acquisition unit 104 is the operation input information about an input of the comment.

In a case where the acquired operation input information is the operation input information about an input of the comment (Yes in step S113), in step S114, the comment control unit 131 generates the comment data to be stored in the comment storage unit 132 based on the acquired operation input information. Further, the comment control unit 131 performs control so as to display the input comment content in the virtual reality space. In this case, the comment control unit 131 displays the comment on the head mounted display 200 worn by the viewer 520 who is permitted to browse the input comment content.

In a case where the acquired operation input information is not the operation input information about an input of the comment (No in step S113), the process returns to step S100.

Note that the flow of control illustrated in FIG. 12 is merely one example. Consequently, for example, the control may be performed in different processing order from the processing order illustrated in FIG. 16.

In the above, the third example embodiment is described. In the present example embodiment, the content of the comment input by the viewer 520 is managed while being associated with the position of the comment object. Consequently, it is possible to easily specify which content in the material the input comment is about. Further, the display control device 130 displays the comment in the virtual reality space. Consequently, because the viewer 520 can browse a comment by the other viewer 520 during the progress of the presentation, convenience of browsing a material can further be improved. In particular, as described above, because it is possible to easily specify which description part in the material the comment corresponds to, in displaying the comment, display linked with the comment object is also easily enabled.

Note that the present invention is not limited to the above example embodiments but may appropriately be modified without departing from the scope of the gist thereof.

The whole or part of the example embodiments disclosed above can be described as, but not limited to, the following supplementary notes.

(Supplementary Note 1)

A display control device comprising:

first display control means for performing control so as to display a page, which is being displayed in a real space, in a first material as a presentation material used in a presentation by a presenter in a first position in a virtual reality space;

second display control means for performing control so as to display a second material in a second position which is different from the first position in the virtual reality space; and operation input information acquisition means for acquiring first operation input information as operation input information which is input by a viewer experiencing the virtual reality space and which is about display of the second material, wherein the second display control means changes a display manner of the second material based on the first operation input information.

(Supplementary Note 2)

The display control device according to Supplementary Note 1, wherein the operation input information acquisition means further acquires second operation input information as operation input information which is input by a viewer experiencing the virtual reality space and which designates an explication object in a content of the second material, and the second display control means further displays explication information as information explicating the explication object in the virtual reality space based on the second operation input information.

(Supplementary Note 3)

The display control device according to Supplementary Note 2, wherein the operation input information acquisition means further acquires third operation input information as operation input information which is input by a viewer experiencing the virtual reality space and which designates an explication level, and the second display control means performs switching to display of explication information at a level corresponding to the third operation input information.

(Supplementary Note 4)

The display control device according to any one of Supplementary Notes 1 to 3, wherein the operation input information acquisition means further acquires fourth operation input information as operation input information which is input by a viewer experiencing the virtual reality space and which is about a comment on the first material or the second material, the fourth operation input information includes a position of a comment object in a material and a comment content, and the display control device further comprises comment control means for managing the position of the comment object and the comment content while associating the position of the comment object and the comment content together.

(Supplementary Note 5)

The display control device according to Supplementary Note 4, wherein when the first material or the second material is displayed in the virtual reality space, the comment control means performs control so as to display the comment content in the virtual reality space while associating the comment content with the position of the comment object in the first material or the second material.

(Supplementary Note 6)

The display control device according to Supplementary Note 5, wherein the fourth operation input information further includes identification information which identifies a viewer inputting a comment, and the comment control means manages the identification information, the position of the comment object, and the comment content while associating the identification information, the position of the comment object, and the comment content together and performs control about whether or not the comment content is displayed when the first material or the second material is displayed in the virtual reality space based on the identification information associated with the comment content.

(Supplementary Note 7)

The display control device according to any one of Supplementary Notes 1 to 6, wherein the second display control means changes pages of the second material as display objects based on the first operation input information.

(Supplementary Note 8)

The display control device according to any one of Supplementary Notes 1 to 6, wherein the second display control means changes at least either one of a display size of the second material or a display position of the second material based on the first operation input information.

(Supplementary Note 9)

The display control device according to any one of Supplementary Notes 1 to 8, wherein the second material is the presentation material.

(Supplementary Note 10)

The display control device according to any one of Supplementary Notes 1 to 8, wherein the second material is a different material from the presentation material.

(Supplementary Note 11)

A presentation system comprising:

a display control device; and a display configured to present a virtual reality space in accordance with control by the display control device, wherein the display control device includes first display control means for performing control so as to display a page, which is being displayed in a real space, in a first material as a presentation material used in a presentation by a presenter in a first position in a virtual reality space, second display control means for performing control so as to display a second material in a second position which is different from the first position in the virtual reality space, operation input information acquisition means for acquiring first operation input information as operation input information which is input by a viewer experiencing the virtual reality space and which is about display of the second material, and picture output means for outputting a picture conforming to control by the first display control means and the second display control means, the second display control means changes a display manner of the second material based on the first operation input information, and the display displays the picture output by the picture output means of the display control device for the viewer.

(Supplementary Note 12)

The presentation system according to Supplementary Note 11, wherein the second display control means changes pages of the second material as display objects based on the first operation input information.

(Supplementary Note 13)

A display control method comprising:

displaying a page, which is being displayed in a real space, in a first material as a presentation material used in a presentation by a presenter in a first position in a virtual reality space;

displaying a second material in a second position which is different from the first position in the virtual reality space; and changing a display manner of the second material based on first operation input information as operation input information which is input by a viewer experiencing the virtual reality space and which is about display of the second material.

(Supplementary Note 14)

A non-transitory computer-readable medium storing a program for causing a computer to execute:

a first display control step of performing control so as to display a page, which is being displayed in a real space, in a first material as a presentation material used in a presentation by a presenter in a first position in a virtual reality space;

a second display control step of performing control so as to display a second material in a second position which is different from the first position in the virtual reality space; and an operation input information acquisition step of acquiring first operation input information as operation input information which is input by a viewer experiencing the virtual reality space and which is about display of the second material, wherein in the second display control step, a display manner of the second material is changed based on the first operation input information.

In the foregoing, the invention of the present application has been described with reference to the example embodiments; however, the invention of the present application is not limited to the above descriptions. Various modifications understandable to a person skilled in the art may be applied to configurations and details of the invention of the present application within the scope of the invention.

The present application claims priority based on Japanese Patent Application No. 2018-208811, filed on Nov. 6, 2018, the entirety of which is incorporated herein by reference.

REFERENCE SIGNS LIST 1 display control device
2 first display control unit
3 second display control unit
4 operation input information acquisition unit
10 presentation system
100 display control device
101 space display control unit
102 material storage unit
103 display state storage unit
104 operation input information acquisition unit
105 display content acquisition unit
106 presenter material display control unit
107 reference material display control unit
108 picture output unit
120 display control device
121 reference material explication display control unit
130 display control device
131 comment control unit
132 comment storage unit
150 network interface
151 memory
152 processor
200 head mounted display
300 terminal device
400 display device
500 presenter
510 viewer
520 viewer

What is claimed is:

1. A display control device comprising:
at least one memory storing instructions; and
at least one processor configured to execute the instructions stored in the memory to:
perform control so as to display a page, which is being displayed in a real space, of a first material as a presentation material used in a presentation by a presenter in a first position in a virtual reality space, the virtual reality space being a three-dimensional space;
perform control so as to display a page of a second material in a second position which is different from the first position in the virtual reality space;
acquire first operation input information as operation input information which is input by a viewer experiencing the virtual reality space and which is about display of the second material; and
change a display manner of the second material based on the first operation input information.

2. The display control device according to claim 1, wherein the processor is further configured to execute the instructions to
acquire second operation input information as operation input information which is input by a viewer experiencing the virtual reality space and which designates an explication object in a content of the second material, and
display explication information as information explicating the explication object in the virtual reality space based on the second operation input information.

3. The display control device according to claim 2, wherein the processor is further configured to execute the instructions to
acquire third operation input information as operation input information which is input by a viewer experiencing the virtual reality space and which designates an explication level, and
perform switching to display of explication information at a level corresponding to the third operation input information.

4. The display control device according to claim 1, wherein the processor is further configured to execute the instructions to
acquire fourth operation input information as operation input information which is input by a viewer experiencing the virtual reality space and which is about a comment on the first material or the second material, the fourth operation input information including a position of a comment object in a material and a comment content, and
manage the position of the comment object and the comment content while associating the position of the comment object and the comment content together.

5. The display control device according to claim 4, wherein when the first material or the second material is displayed in the virtual reality space, the processor is further configured to execute the instructions to perform control so as to display the comment content in the virtual reality space while associating the comment content with the position of the comment object in the first material or the second material.

6. The display control device according to claim 5, wherein
the fourth operation input information further includes identification information which identifies a viewer inputting a comment, and the processor is further configured to execute the instructions to manage the identification information, the position of the comment object, and the comment content while associating the identification information, the position of the comment object, and the comment content together and perform control about whether or not the comment content is displayed when the first material or the second material is displayed in the virtual reality space based on the identification information associated with the comment content.

7. The display control device according to claim 1, wherein the processor is further configured to execute the instructions to change pages of the second material as display objects based on the first operation input information.

8. The display control device according to claim 1, wherein the processor is further configured to execute the instructions to change at least either one of a display size of the second material or a display position of the second material based on the first operation input information.

9. The display control device according to claim 1, wherein the second material is the presentation material.

10. The display control device according to claim 1, wherein the second material is a different material from the presentation material.

11. The display control device according to claim 1, wherein
the page of the first material is being displayed on a predetermined display device in the real space,
the processor is further configured to execute the instructions to receive the page of the first material from a terminal device, the terminal device for outputting the presentation material to the predetermined display device, and
the displayed page in the first position in the virtual reality space is synchronized with the displayed page on the predetermined display device.

12. A display control method comprising:
displaying a page, which is being displayed in a real space, of a first material as a presentation material used in a presentation by a presenter in a first position in a virtual reality space, the virtual reality space being a three-dimensional space;
displaying a page of a second material in a second position which is different from the first position in the virtual reality space; and
changing a display manner of the second material based on first operation input information as operation input information which is input by a viewer experiencing the virtual reality space and which is about display of the second material.

13. A non-transitory computer-readable medium storing a program for causing a computer to execute:
a first display control step of performing control so as to display a page, which is being displayed in a real space, of a first material as a presentation material used in a presentation by a presenter in a first position in a virtual reality space, the virtual reality space being a three-dimensional space;
a second display control step of performing control so as to display a page of a second material in a second position which is different from the first position in the virtual reality space; and
an operation input information acquisition step of acquiring first operation input information as operation input information which is input by a viewer experiencing the virtual reality space and which is about display of the second material,
wherein in the second display control step, a display manner of the second material is changed based on the first operation input information.

\* \* \* \* \*